US008894197B2

(12) United States Patent
Oyanagi et al.

(10) Patent No.: US 8,894,197 B2
(45) Date of Patent: Nov. 25, 2014

(54) INK SET, INK-JET RECORDING METHOD, AND RECORDED MATERIAL

(75) Inventors: Takashi Oyanagi, Shiajid (JP); Keitaro Nakano, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 418 days.

(21) Appl. No.: 12/074,308

(22) Filed: Mar. 3, 2008

(65) Prior Publication Data
US 2008/0213518 A1 Sep. 4, 2008

(30) Foreign Application Priority Data

Mar. 1, 2007 (JP) ................. 2007-051518
Mar. 1, 2007 (JP) ................. 2007-051548
Dec. 6, 2007 (JP) ................. 2007-316368

(51) Int. Cl.
| B41J 2/01 | (2006.01) |
| B41J 2/17 | (2006.01) |
| B41J 2/175 | (2006.01) |
| G01D 11/00 | (2006.01) |
| C09D 11/324 | (2014.01) |
| C09D 11/101 | (2014.01) |
| C09D 11/40 | (2014.01) |
| A61L 24/00 | (2006.01) |
| B29C 71/04 | (2006.01) |
| B32B 27/00 | (2006.01) |
| B32B 27/06 | (2006.01) |
| B32B 23/08 | (2006.01) |
| C08F 290/06 | (2006.01) |
| C08G 73/10 | (2006.01) |
| C08K 3/08 | (2006.01) |
| C08K 5/06 | (2006.01) |
| C08K 5/15 | (2006.01) |
| C08K 5/1535 | (2006.01) |
| C08K 5/1545 | (2006.01) |
| C09D 5/00 | (2006.01) |
| C09D 5/38 | (2006.01) |
| C09D 11/00 | (2014.01) |
| C09J 7/02 | (2006.01) |

(52) U.S. Cl.
CPC .............. *C09D 11/40* (2013.01); *C09D 11/324* (2013.01); *C09D 11/101* (2013.01)
USPC ................ 347/102; 347/1; 347/84; 347/85; 347/86; 347/95; 347/98; 347/100; 522/71; 522/81; 522/184; 523/160; 523/161; 524/107; 524/110; 524/111; 524/366; 524/376; 524/439; 524/440; 524/441; 428/500; 428/507

(58) Field of Classification Search
USPC ........ 523/160, 161; 347/1, 84, 85, 86, 95, 98, 347/100, 102; 428/500, 507; 524/439, 440, 524/441, 107, 110, 111, 366; 522/71, 522/81, 184
See application file for complete search history.

(56) References Cited

U.S. PATENT DOCUMENTS

| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |

(Continued)

FOREIGN PATENT DOCUMENTS

| CN | 1060995 A | 5/1992 |
| CN | 1086637 A | 5/1994 |

(Continued)

OTHER PUBLICATIONS

Machine English translation of JP 2006-282823, Mukai et al., Oct. 2006.*
Examination report issued Sep. 23, 2011 for JP2006-201363.
Office Action issued Mar. 8, 2012 for U.S. Appl. No. 12/228,193.
EP 11177753.8 search report issued Nov. 2, 2011.
JP 2007-137582 Office Action issued Feb. 28, 2012.
U.S. Appl. No. 12/894,423 Office Action dated Nov. 10, 2011.
U.S. Appl. No. 13/240,667 Office Action dated Dec. 12, 2011.
Office Action for JP2007-304874.
European Search Report for EP07024545.1 dated Apr. 21, 2008.

(Continued)

*Primary Examiner* — Patrick Niland
(74) *Attorney, Agent, or Firm* — Nutter McClennen & Fish LLP; John J. Penny, V; Isaac A. Hubner

(57) ABSTRACT

An ink set includes a metallic ink composition containing a metal pigment and at least one curable ink composition selected from the group consisting of a chromatic ink composition, a black ink composition, and a white ink composition.

10 Claims, No Drawings

(56) References Cited

U.S. PATENT DOCUMENTS

| | | | |
|---|---|---|---|
| 4,922,004 A | 5/1990 | Kohler et al. | |
| 5,041,516 A | 8/1991 | Frechet et al. | |
| 5,077,402 A | 12/1991 | Desobry et al. | |
| 5,212,212 A | 5/1993 | Fonda | |
| 5,221,334 A | 6/1993 | Ma et al. | |
| 5,281,682 A | 1/1994 | Comforth et al. | |
| 5,453,121 A | 9/1995 | Nicholls et al. | |
| 5,479,193 A | 12/1995 | Shimoda et al. | |
| 5,504,512 A | 4/1996 | Shimoda et al. | |
| 5,609,671 A | 3/1997 | Nagasawa | |
| 5,623,001 A | 4/1997 | Figov | |
| 5,662,736 A | 9/1997 | Sakai et al. | |
| 5,662,738 A | 9/1997 | Schmid et al. | |
| 5,690,723 A | 11/1997 | Sano et al. | |
| 5,846,306 A | 12/1998 | Kubota et al. | |
| 5,903,290 A * | 5/1999 | Nicoloff et al. | 347/43 |
| 5,928,419 A | 7/1999 | Uemura et al. | |
| 5,952,401 A | 9/1999 | Kimura et al. | |
| 5,958,121 A | 9/1999 | Lin | |
| 5,976,233 A | 11/1999 | Osumi et al. | |
| 6,030,441 A | 2/2000 | Kubota et al. | |
| 6,087,416 A | 7/2000 | Pearlstine et al. | |
| 6,114,404 A | 9/2000 | Deeken et al. | |
| 6,117,606 A | 9/2000 | Macholdt et al. | |
| 6,123,759 A | 9/2000 | Mise et al. | |
| 6,136,286 A | 10/2000 | Okuyama et al. | |
| 6,179,415 B1 | 1/2001 | Okazaki et al. | |
| 6,187,897 B1 | 2/2001 | Kawashima et al. | |
| 6,300,388 B1 | 10/2001 | Verdonck et al. | |
| 6,322,188 B1 | 11/2001 | Sano | |
| 6,331,111 B1 | 12/2001 | Cao | |
| 6,332,291 B1 | 12/2001 | Flosbach et al. | |
| 6,341,841 B1 | 1/2002 | Shimada et al. | |
| 6,395,079 B1 | 5/2002 | Sano | |
| 6,419,733 B1 | 7/2002 | Sano et al. | |
| 6,428,662 B1 | 8/2002 | Woodruff et al. | |
| 6,433,038 B1 | 8/2002 | Tanabe et al. | |
| 6,444,019 B1 | 9/2002 | Zou et al. | |
| 6,488,751 B1 | 12/2002 | Takemoto | |
| 6,491,748 B2 | 12/2002 | Watanabe | |
| 6,518,370 B2 | 2/2003 | Abuelyaman et al. | |
| 6,558,460 B1 | 5/2003 | Walker et al. | |
| 6,558,753 B1 | 5/2003 | Ylitalo et al. | |
| 6,602,333 B2 | 8/2003 | Miyabayashi | |
| 6,637,850 B2 | 10/2003 | Shimada et al. | |
| 6,653,367 B2 | 11/2003 | Miyabayashi | |
| 6,654,367 B1 | 11/2003 | Kaufman | |
| 6,664,306 B2 | 12/2003 | Gaddam et al. | |
| 6,726,756 B1 | 4/2004 | Zou et al. | |
| 6,793,313 B1 | 9/2004 | Adachi et al. | |
| 6,793,318 B2 | 9/2004 | Saksa | |
| 6,846,074 B2 | 1/2005 | Hirai | |
| 6,846,851 B2 | 1/2005 | Nakhmanovich et al. | |
| 6,849,110 B2 | 2/2005 | Sano | |
| 6,869,470 B2 | 3/2005 | Kato | |
| 6,877,851 B2 | 4/2005 | Watanabe | |
| 6,890,049 B2 | 5/2005 | Shimada et al. | |
| 6,924,327 B2 | 8/2005 | Sano et al. | |
| 6,989,054 B2 | 1/2006 | Tanabe et al. | |
| 7,008,475 B2 | 3/2006 | Randler et al. | |
| 7,025,449 B2 | 4/2006 | Simons et al. | |
| 7,040,747 B2 | 5/2006 | Kubota et al. | |
| 7,064,153 B2 | 6/2006 | Bruck | |
| 7,156,909 B2 | 1/2007 | Oyanagi et al. | |
| 7,259,100 B2 * | 8/2007 | Zurcher et al. | 438/700 |
| 7,285,592 B2 | 10/2007 | Harz et al. | |
| 7,296,883 B2 | 11/2007 | Kanaya et al. | |
| 7,303,619 B2 | 12/2007 | Oyanagi | |
| 7,348,128 B2 | 3/2008 | Yamada et al. | |
| 7,384,472 B2 | 6/2008 | Schweikart et al. | |
| 7,419,255 B2 | 9/2008 | Kawaguchi et al. | |
| 7,438,405 B2 | 10/2008 | Ichizawa et al. | |
| 7,513,945 B2 | 4/2009 | Nakano et al. | |
| 7,538,144 B2 | 5/2009 | Vanmaele et al. | |
| 7,581,829 B2 | 9/2009 | Oyanagi et al. | |
| 7,591,889 B2 | 9/2009 | Stoffel et al. | |
| 7,604,693 B2 | 10/2009 | Oyanagi et al. | |
| 7,619,015 B2 | 11/2009 | Oyanagi et al. | |
| 7,670,418 B2 | 3/2010 | Kato et al. | |
| 7,732,505 B2 | 6/2010 | Kito et al. | |
| 7,753,514 B2 | 7/2010 | Nakano et al. | |
| 7,790,245 B2 | 9/2010 | Oyanagi et al. | |
| 7,828,888 B2 | 11/2010 | Itano et al. | |
| 7,846,246 B2 | 12/2010 | Oyanagi et al. | |
| 7,850,280 B2 | 12/2010 | Oyanagi et al. | |
| 7,854,798 B2 | 12/2010 | Udagawa et al. | |
| 7,855,041 B2 | 12/2010 | Weber et al. | |
| 7,866,807 B2 | 1/2011 | Makuta et al. | |
| 7,968,621 B2 | 6/2011 | Oyanagi et al. | |
| 8,044,116 B2 | 10/2011 | Idemura et al. | |
| 8,097,075 B2 | 1/2012 | Oyanagi et al. | |
| 8,105,429 B2 | 1/2012 | Oyanagi et al. | |
| 8,227,539 B2 | 7/2012 | Oyanagi et al. | |
| 2003/0003296 A1 | 1/2003 | Dries et al. | |
| 2003/0017353 A1 | 1/2003 | Yamaguchi et al. | |
| 2003/0050379 A1 | 3/2003 | Shih et al. | |
| 2003/0089271 A1 | 5/2003 | Hirano et al. | |
| 2003/0144377 A1 | 7/2003 | Sano et al. | |
| 2003/0153649 A1 | 8/2003 | Bromberg | |
| 2003/0157356 A1 | 8/2003 | Tamura et al. | |
| 2003/0176566 A1 | 9/2003 | Wight et al. | |
| 2003/0222959 A1 | 12/2003 | Yamanouchi et al. | |
| 2003/0231234 A1 | 12/2003 | Ushirogouchi et al. | |
| 2004/0021753 A1 | 2/2004 | Yoshihiro et al. | |
| 2004/0069183 A1 | 4/2004 | Kamoto et al. | |
| 2004/0257419 A1 | 12/2004 | Iinuma et al. | |
| 2004/0266907 A1 | 12/2004 | Sugita et al. | |
| 2005/0039631 A1 | 2/2005 | Best et al. | |
| 2005/0133616 A1 | 6/2005 | Shimoda et al. | |
| 2005/0158524 A1 | 7/2005 | Sloat et al. | |
| 2005/0159501 A1 | 7/2005 | Kiefer-Liptak | |
| 2005/0176841 A1 | 8/2005 | Krohn | |
| 2005/0176847 A1 | 8/2005 | Cagle | |
| 2005/0197418 A1 | 9/2005 | Graziano et al. | |
| 2005/0197419 A1 | 9/2005 | Graziano et al. | |
| 2005/0282930 A1 | 12/2005 | Fu et al. | |
| 2006/0009546 A1 | 1/2006 | Brown | |
| 2006/0014849 A1 | 1/2006 | Vanmaele et al. | |
| 2006/0014850 A1 | 1/2006 | Vanmaele et al. | |
| 2006/0036001 A1 | 2/2006 | Oyanagi et al. | |
| 2006/0078695 A1 | 4/2006 | Sen et al. | |
| 2006/0092254 A1 | 5/2006 | Claes et al. | |
| 2006/0158493 A1 | 7/2006 | Nakano et al. | |
| 2006/0160917 A1 | 7/2006 | Oyanagi et al. | |
| 2006/0187285 A1 | 8/2006 | Oyanagi et al. | |
| 2006/0189712 A1 | 8/2006 | Kondo | |
| 2006/0211788 A1 | 9/2006 | Krohn | |
| 2006/0229382 A1 | 10/2006 | Schweikart et al. | |
| 2006/0268084 A1 | 11/2006 | Nishizaki et al. | |
| 2007/0022547 A1 | 2/2007 | O'Brien | |
| 2007/0031615 A1 | 2/2007 | Nair et al. | |
| 2007/0037961 A1 | 2/2007 | Oyanagi et al. | |
| 2007/0044684 A1 | 3/2007 | Nakano et al. | |
| 2007/0046720 A1 | 3/2007 | Konno et al. | |
| 2007/0060670 A1 | 3/2007 | Ellis | |
| 2007/0076069 A1 * | 4/2007 | Edwards et al. | 347/100 |
| 2007/0120926 A1 | 5/2007 | Doumaux et al. | |
| 2007/0129457 A1 | 6/2007 | Nakano et al. | |
| 2007/0142501 A1 | 6/2007 | Oyanagi et al. | |
| 2007/0148585 A1 | 6/2007 | Kaneko et al. | |
| 2007/0148686 A1 | 6/2007 | Kirszenbaum et al. | |
| 2007/0222811 A1 | 9/2007 | Yanagi | |
| 2007/0224345 A1 | 9/2007 | Metz et al. | |
| 2007/0249750 A1 | 10/2007 | Oyanagi et al. | |
| 2007/0281141 A1 | 12/2007 | Kohlweyer | |
| 2008/0022893 A1 | 1/2008 | Mizutani | |
| 2008/0024577 A1 | 1/2008 | Nakano et al. | |
| 2008/0028980 A1 | 2/2008 | Aoki et al. | |
| 2008/0081119 A1 | 4/2008 | Oyanagi et al. | |
| 2008/0090931 A1 | 4/2008 | Nagvekar et al. | |
| 2008/0096998 A1 | 4/2008 | Oyanagi et al. | |
| 2008/0098928 A1 | 5/2008 | Oyanagi et al. | |
| 2008/0125511 A1 | 5/2008 | Nakano et al. | |
| 2008/0132599 A1 | 6/2008 | Nakano et al. | |

(56) References Cited

U.S. PATENT DOCUMENTS

| | | |
|---|---|---|
| 2008/0145628 A1 | 6/2008 | Oyanagi et al. |
| 2008/0146689 A1 | 6/2008 | Oyanagi et al. |
| 2008/0152825 A1 | 6/2008 | Mukai et al. |
| 2008/0152828 A1 | 6/2008 | Mukai et al. |
| 2008/0152877 A1 | 6/2008 | Mukai et al. |
| 2008/0173214 A1 | 7/2008 | Oyanagi et al. |
| 2008/0182083 A1 | 7/2008 | Oyanagi et al. |
| 2008/0182085 A1 | 7/2008 | Oyanagi et al. |
| 2008/0207805 A1 | 8/2008 | Blease et al. |
| 2008/0213518 A1 | 9/2008 | Oyanagi et al. |
| 2008/0233362 A1 | 9/2008 | Kato et al. |
| 2008/0250970 A1 | 10/2008 | Oyanagi et al. |
| 2008/0308004 A1 | 12/2008 | Deroover et al. |
| 2009/0053415 A1 | 2/2009 | Isobe |
| 2009/0075036 A1 | 3/2009 | Itano et al. |
| 2009/0099277 A1 | 4/2009 | Nagvekar et al. |
| 2009/0110827 A1 | 4/2009 | Nakano et al. |
| 2009/0142555 A1 | 6/2009 | Sano et al. |
| 2009/0169834 A1 | 7/2009 | Sano et al. |
| 2009/0208651 A1 | 8/2009 | Oyanagi et al. |
| 2009/0214833 A1* | 8/2009 | Oyanagi et al. ............ 428/195.1 |
| 2009/0220695 A1 | 9/2009 | Oyanagi et al. |
| 2009/0233064 A1 | 9/2009 | Yatake et al. |
| 2009/0246479 A1 | 10/2009 | Mukai et al. |
| 2009/0280265 A1 | 11/2009 | Oyanagi et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1 | 4/2010 | Mukai et al. |
| 2010/0092674 A1 | 4/2010 | Mukai et al. |
| 2010/0092675 A1 | 4/2010 | Aoki |
| 2011/0014440 A1 | 1/2011 | Itano et al. |
| 2011/0036266 A1 | 2/2011 | Oyanagi et al. |
| 2011/0183124 A1 | 7/2011 | Aoki et al. |
| 2011/0183125 A1 | 7/2011 | Aoki et al. |
| 2011/0287236 A1 | 11/2011 | Nakano et al. |
| 2012/0006224 A1 | 1/2012 | Oyanagi et al. |

FOREIGN PATENT DOCUMENTS

| | | |
|---|---|---|
| CN | 1398724 A | 2/2003 |
| CN | 1529740 A | 9/2004 |
| CN | 1721462 A | 1/2006 |
| CN | 1771307 A | 5/2006 |
| DE | 10 2005 021 160 A1 | 11/2006 |
| EP | 0 040 721 A2 | 12/1981 |
| EP | 0 042 567 A2 | 12/1981 |
| EP | 0 192 167 A1 | 8/1986 |
| EP | 0 284 561 A2 | 9/1988 |
| EP | 0333224 | 9/1989 |
| EP | 0352821 A1 | 1/1990 |
| EP | 0 372 778 A1 | 6/1990 |
| EP | 0 400 721 A2 | 12/1990 |
| EP | 0 894 835 A2 | 2/1999 |
| EP | 0997507 A1 | 5/2000 |
| EP | 1 045 013 A1 | 10/2000 |
| EP | 1260563 A1 | 11/2002 |
| EP | 1 295 916 A1 | 3/2003 |
| EP | 1 422 072 A1 | 5/2004 |
| EP | 1452569 A1 | 9/2004 |
| EP | 1 616 920 A1 | 1/2006 |
| EP | 1614730 A1 | 1/2006 |
| EP | 1616921 A1 | 1/2006 |
| EP | 1674499 A1 | 6/2006 |
| EP | 1752504 A1 | 2/2007 |
| EP | 1806387 A1 | 7/2007 |
| EP | 1815978 A1 | 8/2007 |
| EP | 1837381 A1 | 9/2007 |
| EP | 1 862 511 A1 | 12/2007 |
| EP | 1 892 105 A1 | 2/2008 |
| EP | 1 942 157 A2 | 7/2008 |
| EP | 1 942 158 A2 | 7/2008 |
| EP | 1 947 151 A1 | 7/2008 |
| EP | 1 950 260 A1 | 7/2008 |
| GB | 1 276 369 A | 6/1972 |
| GB | 1 547 283 A | 6/1979 |
| GB | 2 029 433 A | 3/1980 |
| GB | 2 172 655 A | 9/1986 |
| GB | 2 367 299 A | 4/2002 |
| JP | 47-003981 B | 2/1972 |
| JP | 47-006416 B | 2/1972 |
| JP | 47-022326 B | 6/1972 |
| JP | 47-023664 B | 7/1972 |
| JP | 56-028256 A | 3/1981 |
| JP | 57-030704 A | 2/1982 |
| JP | 59-042864 B2 | 10/1984 |
| JP | 60-026403 B2 | 6/1985 |
| JP | 60-026483 B2 | 6/1985 |
| JP | 61-194062 A | 8/1986 |
| JP | 62-001426 A | 1/1987 |
| JP | 62-081345 A | 4/1987 |
| JP | 63-061950 B2 | 11/1988 |
| JP | 01-034242 B2 | 7/1989 |
| JP | 01-238656 A | 9/1989 |
| JP | 02-009596 B2 | 3/1990 |
| JP | 02-009597 B2 | 3/1990 |
| JP | 02-211452 A | 8/1990 |
| JP | 03-056573 A | 3/1991 |
| JP | 03-079678 A | 4/1991 |
| JP | 03-160068 A | 7/1991 |
| JP | 03216379 A | 9/1991 |
| JP | 04-018462 A | 1/1992 |
| JP | 05186725 A | 7/1993 |
| JP | 07-258578 A | 10/1995 |
| JP | 08-003498 A | 1/1996 |
| JP | 08218018 A | 8/1996 |
| JP | 08-283596 A | 10/1996 |
| JP | 08-295836 A | 11/1996 |
| JP | 10-110110 A | 4/1998 |
| JP | 10-110111 A | 4/1998 |
| JP | 10-110114 A | 4/1998 |
| JP | 10-120956 A | 5/1998 |
| JP | 10-120958 A | 5/1998 |
| JP | 10-195331 A | 7/1998 |
| JP | 10-195360 A | 7/1998 |
| JP | 10-237349 A | 9/1998 |
| JP | 10287035 A | 10/1998 |
| JP | 10-330665 A | 12/1998 |
| JP | 11-011002 A | 1/1999 |
| JP | 11165420 A | 6/1999 |
| JP | 11-193316 A | 7/1999 |
| JP | 11-202558 A | 7/1999 |
| JP | 11-343436 A | 12/1999 |
| JP | 2000-044858 A | 2/2000 |
| JP | 2000044861 A | 2/2000 |
| JP | 2000-345080 A | 12/2000 |
| JP | 2000-355667 A | 12/2000 |
| JP | 2000336295 A | 12/2000 |
| JP | 2001348519 A | 12/2001 |
| JP | 2001348519 A | 12/2001 |
| JP | 2002-038063 A | 2/2002 |
| JP | 2002-179960 | 6/2002 |
| JP | 2002-225414 A | 8/2002 |
| JP | 2002-249165 A | 9/2002 |
| JP | 2002-256189 A | 9/2002 |
| JP | 2002-529572 A | 9/2002 |
| JP | 2002-292775 A | 10/2002 |
| JP | 2002-332436 A | 11/2002 |
| JP | 2002-348513 A | 12/2002 |
| JP | 2003012971 A | 1/2003 |
| JP | 2003-055463 A | 2/2003 |
| JP | 2003-055563 A | 2/2003 |
| JP | 2003-096337 A | 4/2003 |
| JP | 2003-147233 A | 5/2003 |
| JP | 2003253148 A | 9/2003 |
| JP | 2003-292836 | 10/2003 |
| JP | 2003-292857 A | 10/2003 |
| JP | 2003-306625 | 10/2003 |
| JP | 2003-306625 A | 10/2003 |
| JP | 2003311945 A | 11/2003 |
| JP | 2003-342499 A | 12/2003 |
| JP | 2004-009360 A | 1/2004 |

(56) References Cited

FOREIGN PATENT DOCUMENTS

| | | |
|---|---|---|
| JP | 2004009359 A | 1/2004 |
| JP | 2004018716 A | 1/2004 |
| JP | 2004-059857 A | 2/2004 |
| JP | 2004-066817 A | 3/2004 |
| JP | 2004099796 A | 4/2004 |
| JP | 2004-161852 A | 6/2004 |
| JP | 2004-174971 A | 6/2004 |
| JP | 2004195797 A | 7/2004 |
| JP | 2004197055 A | 7/2004 |
| JP | 2004-216654 A | 8/2004 |
| JP | 2004-263139 A | 9/2004 |
| JP | 2004-264435 A | 9/2004 |
| JP | 2004250659 A | 9/2004 |
| JP | 2004-535506 A | 11/2004 |
| JP | 2004-535508 A | 11/2004 |
| JP | 2004-359960 A | 12/2004 |
| JP | 2005-007577 A | 1/2005 |
| JP | 2005-015813 A | 1/2005 |
| JP | 2005008690 A | 1/2005 |
| JP | 2005023284 A | 1/2005 |
| JP | 2005023299 A | 1/2005 |
| JP | 2005-036079 A | 2/2005 |
| JP | 2005-060411 A | 3/2005 |
| JP | 2005-060419 A | 3/2005 |
| JP | 2005-068250 | 3/2005 |
| JP | 2005-068251 | 3/2005 |
| JP | 2005-068252 | 3/2005 |
| JP | 2005-068439 A | 3/2005 |
| JP | 2005096254 A | 4/2005 |
| JP | 2005-161583 A | 6/2005 |
| JP | 2005187659 A | 7/2005 |
| JP | 2005-220352 A | 8/2005 |
| JP | 2005290362 A | 10/2005 |
| JP | 2005298757 A | 10/2005 |
| JP | 2005314655 A | 11/2005 |
| JP | 2005-350551 A | 12/2005 |
| JP | 2005-536375 A | 12/2005 |
| JP | 2006-070255 A | 3/2006 |
| JP | 2006-117795 A | 5/2006 |
| JP | 2006-117931 A | 5/2006 |
| JP | 2006117794 A | 5/2006 |
| JP | 2006123529 A | 5/2006 |
| JP | 2006123542 A | 5/2006 |
| JP | 2006137183 A | 6/2006 |
| JP | 2006176734 A | 7/2006 |
| JP | 2006199929 A | 8/2006 |
| JP | 2006206875 A | 8/2006 |
| JP | 2006-241194 A | 9/2006 |
| JP | 2006257302 A | 9/2006 |
| JP | 2006257303 A | 9/2006 |
| JP | 2006-265292 | 10/2006 |
| JP | 2006-265524 | 10/2006 |
| JP | 2006-265524 A | 10/2006 |
| JP | 2006-272933 A | 10/2006 |
| JP | 2006-281538 A | 10/2006 |
| JP | 2006-281568 A | 10/2006 |
| JP | 2006-281570 A | 10/2006 |
| JP | 2006-282822 A | 10/2006 |
| JP | 2006-282823 A | 10/2006 |
| JP | 2006-283017 A | 10/2006 |
| JP | 2006-523762 A | 10/2006 |
| JP | 2006274025 A | 10/2006 |
| JP | 2006274029 A | 10/2006 |
| JP | 2006312711 A | 11/2006 |
| JP | 2007-016103 | 1/2007 |
| JP | 2007-023161 | 2/2007 |
| JP | 2007-045989 A | 2/2007 |
| JP | 2007-045990 A | 2/2007 |
| JP | 2007-046034 | 2/2007 |
| JP | 2007055084 A | 3/2007 |
| JP | 2007100053 A | 4/2007 |
| JP | 2007100054 A | 4/2007 |
| JP | 2007-131741 | 5/2007 |
| JP | 2007112970 A | 5/2007 |
| JP | 2007-138084 | 6/2007 |
| JP | 2007-154087 A | 6/2007 |
| JP | 2007-169306 | 7/2007 |
| JP | 2007-169307 | 7/2007 |
| JP | 2007-169308 | 7/2007 |
| JP | 2007-169451 | 7/2007 |
| JP | 2007-169451 A | 7/2007 |
| JP | 2007-182535 | 7/2007 |
| JP | 2007-182536 | 7/2007 |
| JP | 2007-191613 A | 8/2007 |
| JP | 2007-211036 A | 8/2007 |
| JP | 2007-254735 A | 10/2007 |
| JP | 2007-262272 A | 10/2007 |
| JP | 2007-269017 | 10/2007 |
| JP | 2007-270085 A | 10/2007 |
| JP | 2007-297586 A | 11/2007 |
| JP | 2008-075067 A | 4/2008 |
| JP | 2008-138045 A | 6/2008 |
| JP | 2008-155523 A | 7/2008 |
| JP | 2008-155524 A | 7/2008 |
| JP | 2008-174712 A | 7/2008 |
| JP | 2009-113494 A | 5/2009 |
| JP | 2009-114454 A | 5/2009 |
| JP | 2009-242441 A | 10/2009 |
| JP | 2010-006062 A | 1/2010 |
| JP | 2010-018651 A | 1/2010 |
| JP | 2010-090270 A | 4/2010 |
| JP | 2010-090271 A | 4/2010 |
| JP | 2010-094809 A | 4/2010 |
| JP | 2010-094852 A | 4/2010 |
| WO | WO-9321235 A1 | 10/1993 |
| WO | 99/05230 A1 | 2/1999 |
| WO | WO-0052530 A1 | 9/2000 |
| WO | WO-0108895 A1 | 2/2001 |
| WO | WO-0238687 A1 | 5/2002 |
| WO | 02/55619 A1 | 7/2002 |
| WO | 02/76764 A2 | 10/2002 |
| WO | 2004/018197 A1 | 3/2004 |
| WO | 2004/031308 A1 | 4/2004 |
| WO | 2004/052947 A1 | 6/2004 |
| WO | 2004/094534 A1 | 11/2004 |
| WO | WO-2004104051 A1 | 12/2004 |
| WO | WO-2005047405 A1 | 5/2005 |
| WO | 2005061566 A1 | 7/2005 |
| WO | WO-2005089957 A1 | 9/2005 |
| WO | 2005/095006 A1 | 10/2005 |
| WO | WO-2005095006 A1 | 10/2005 |
| WO | 2006/041004 A1 | 4/2006 |
| WO | 2006/087930 A1 | 8/2006 |
| WO | 2006085992 A2 | 8/2006 |
| WO | 2006101054 A1 | 9/2006 |
| WO | WO 2006/101054 * | 9/2006 |
| WO | WO-2006098676 A1 | 9/2006 |
| WO | 2006112031 A1 | 10/2006 |
| WO | WO-2007026355 A2 | 3/2007 |
| WO | WO-2007026366 A1 | 3/2007 |
| WO | 2007/060264 A2 | 5/2007 |

OTHER PUBLICATIONS

Office Action for CN200910004654.
Office Action for JP2007-316368.
Extended European Search Report issued May 11, 2011 for Application No. 11152226.4 (4 Pages).
[No Author Listed] Ciba IRGACURE 819. Photoinitiator. Ciba Specialty Chemicals Inc., Coating Effects Segment. Aug. 30, 2001, 3 pages.
[No Author Listed] Dispersion. Definition. Hawley's Condensed Chemical Dictionary [Online]. 2007, 1 page. Retrieved Oct. 22, 2010.
[No Author Listed] Dispersion (chemistry). Definition. Wikipedia. Last Modified Oct. 22, 2010. 2 pages. Retrieved Oct. 25, 2010 from <http://en.wikipedia.org/w/index.php?title=Dispersion (chemistry)&printable=yes>.
[No Author Listed] IRGACURE 127. Photoinitiator. Ciba Specialty Chemicals Inc., Coating Effects Segment. Apr. 9, 2004, 4 pages.
[No Author Listed] Laromer UA 9209 V. Technical Information. BASF Aktiengesellschaft. EVP 009403 e, Rev. 0, Dec. 2003. 4 pages.
[No Author Listed] Organic Materials for Imaging, The Japanese Research Association for Organic Electronics Materials. Bunshin Publishing Co., p. 187-192 (1993).

(56) References Cited

OTHER PUBLICATIONS

Chatterjee et al., "Photochemistry of Carbocyanine Alkyltriphenylborate Salts: Intra-Ion Pair Electron Transfer and the Chemistry of Boranyl Radicals", Journal of American Chemistry Society, vol. 112, p. 6329-6338 (1990).

Davidson, R.S., "The Chemistry of Photoinitiators—some recent developments", Journal of Photochemistry and Photobiology A: Chemistry, vol. 73, p. 81-96 (1993).

Eaton, D.F., "One-electron Oxidation of Benzyltrialkylstannanes. 1. Cation Radical Fragmentation by Dual Modes", Journal of American Chemistry Society, vol. 102, p. 3278-3281 (1980).

Extended European Search Report issued Dec. 29, 2008 in connection with European Application No. 08016440.3 (5 Pages).

Fouassier, J.P., et al., "Radiation Curing in Polymer Science and Technology. Volume 1: Fundamentals and Methods," Elsevier Applied Science, vol. 1, p. 77-117 (1993).

"Fouassier, J.P., "Photoinitiated Polymerisation—Theory and Applications" Rapra Review Reports, vol. 9, No. 4, p. 1-23 (1998).".

International Search Report mailed Sep. 16, 2008 from Related International Application No. PCT/JP2008/064126. (2 pages).

Maslak, P, "Fragmentations by Photoinduced Electron Transfer. Fundamentals and Practical Aspects", Topics in Current Chemistry, vol. 168, p. 1-46 (1993).

Monroe et al., "Photoinitiators for Free-Radical-Initiated Photoimaging Systems", Chemical Reviews, vol. 93, p. 435-448 (1993).

Saeva, F.D., "Photoinduced Electron Transfer (PET) Bond Cleavage Reactions", Topics in Current Chemistry, vol. 156, p. 59-62 (1990).

Shirai et al., "Photoacid and Photobase Generators: Chemistry and Applications to Polymeric Materials", Prog. Polym. ScL, vol. 21, p. 1-45 (1996).

Step et al., Mechanism of polymer stabilization by hindered-amine light stabilizaers (HALS). Model investigations of the interaction of peroxy radicals with HALS amines and amino ethers. Marcomolecules. 1994;27:2529-2539.

U.S. Non-final Office Action for U.S. Appl. No. 12/228,193, mailed Jun. 2, 2011.

U.S. Office Action for U.S. Appl. No. 12/228,193, mailed Oct. 14, 2011 (7 Pages).

U.S. Office Action for U.S. Appl. No. 12/228,224, issued Jun. 2, 2011 (13 Pages).

Notice of Allowance for U.S. Appl. No. 12/228,224, issued Oct. 20, 2011 (8 Pages).

U.S. Office Action issued Jan. 6, 2012 for U.S. Appl. No. 13/197,174 (8 Pages).

Chinese Office Action issued Nov. 30, 2010 for Application No. 200910004654.0 (5 pages).

Japanese Office Action issued May 25, 2011 for Application No. 2007-304874 (2 Pages).

Japanese Office Action issued Mar. 9, 2011 for Application No. 2007-316368 (2 Pages).

U.S. Office Action issued Apr. 26, 2012 for U.S. Appl. No. 12/394,336 (13 Pages).

U.S. Supplemental Notice of Allowance issued Jun. 28, 2012 for U.S. Appl. No. 12/228,224 (2 Pages).

U.S. Office Action issued May 29, 2012 for U.S. Appl. No. 12/894,423 (9 Pages).

"Next generation in-can stabilizer for outstanding stabilization performance of UV curable inks and coatings," Ciba IRGASTAB UV 22, Ciba Specialty Chemicals, Inc., 2006.

"Photinitiator," Ciba IRGACURE 369, Ciba Specialty Chemicals, Inc., Sep. 4, 2001.

"Photoinitiator," Ciba Darocur EDB, Ciba Specialty Chemicals, Inc., Feb. 20, 2003.

"Surface Additives for Radiation Curable Systems," BYK Additives & Instruments, Issue Jul. 2008, BYK-Chemie GmbH, Germany., Jul. 2008.

Craig J. Hawker and J. M. J. Frechet, "Preparation of Polymers with Controlled Molecular Architecture. A New Convergent Approach to Dendritic Macromolecules," Journal of American Chemistry, 1990, 112, 7638-7647.

Craig J. Hawker, Fengkui Chu, Peter J. Pomery, and David J. T. Hill, "Hyperbranched Poly(ethylene glycol)s: A New Class of Ion-Conducting Materials," Macromolecules, 29, 3831-3838, 1996.

Young H. Kim, "Highly Branched Aromatic Polymers Prepared by Single Step Syntheses," Macromol. Symp. 77, 21-33, 1994.

* cited by examiner

INK SET, INK-JET RECORDING METHOD, AND RECORDED MATERIAL

BACKGROUND

1. Technical Field

The present invention relates to ink sets, ink-jet recording methods, and recorded materials, and particularly to an ink set and an ink-jet recording method that allow formation of a coating with a metallic finish and a recorded material having such a coating.

2. Related Art

A coating with a metallic finish on a printed material is formed using, for example, a printing ink containing a gold powder formed of brass microparticles or a silver powder formed of aluminum microparticles as a pigment, or by foil stamping or thermal transfer using metal foil.

A coating formed using a printing ink containing a gold or silver powder, however, has a matt metallic finish and cannot attain a mirror finish because the metal powder used has a large average particle size, namely, 10 to 30 μm. In foil stamping or thermal transfer using metal foil, a smooth metal foil is laminated on an adhesive-coated recording medium and is pressed and thermally fused by heating. This method provides a relatively good finish, although its application is limited to recording media resistant to heat and deformation because the method involves many production steps and the media are exposed to pressure and heat during the production steps.

There have recently been many applications of ink jetting to printing, an example of which is metallic printing. JP-A-2002-179960, for example, discloses a technique of ink-jet printing using an ink composition containing a pigment formed of metal-coated plastic spherical particles. To attain a highly metallic finish, however, the spherical particles must be deformed to a flat shape to provide a smooth surface. According to this technique, therefore, roller pressing and heating must be simultaneously performed. This requires a complicated apparatus or production process and also limits the range of recording media that can be used.

JP-A-2003-292836 and JP-A-2003-306625 disclose techniques using an ink composition in which a colloid of a noble metal such as gold or silver is dispersed. This ink composition, however, cannot attain a metallic finish because the noble metal colloid shows a color originating from plasmon absorption if its particle size is reduced to several to tens of nanometers to ensure sufficient dispersion stability. In this case, a good metallic finish can be attained by drying and heating the coating to fuse the colloid particles. Even though a metallic finish is attained using these techniques, it is difficult to form a highly metallic mirror finish with relative specular glossinesses exceeding 200, 200, and 100 at incident angles of 20°, 60°, and 85°, respectively, over a surface evenly without irregularities. If the particle size is increased to ensure a highly metallic mirror finish, the ink composition has low dispersion stability, and the problem of aggregation and sedimentation cannot be avoided, thus showing a significantly decreased storage life. Furthermore, it is self-evident that the use of a noble metal is disadvantageous in terms of cost; it can only be used for high-value-added applications because it significantly raises the cost of the ink composition.

SUMMARY

An advantage of some aspects of the invention, focusing on aluminum as a less expensive metal material, is that it provides an ink set including an ink composition having a highly metallic mirror gloss to form a coating with a metallic finish on a printed material and a curable ink composition that can be used to perform metallic printing with any color. Another advantage of the aspects of the invention is that it provides an ink set including a binary curable ink composition that does not gel during storage and has superior storage stability.

As a result of intensive studies, the inventors have found that a recorded material with high relative specular glossiness, which could not be achieved by the related art, can be obtained using a metallic pigment dispersion containing a particular metallic pigment, an ink composition containing the metal pigment, and an ink-jet recording method using the ink composition. Based on these findings, the inventors have completed the invention.

An ink set according to a first aspect of the invention includes a metallic ink composition containing a metal pigment and at least one curable ink composition selected from the group consisting of a chromatic ink composition, a black ink composition, and a white ink composition.

An ink set according to a second aspect of the invention includes a metallic ink composition containing a metal pigment, a first curable ink composition containing no colorant, and at least one second curable ink composition containing a colorant selected from the group consisting of a chromatic pigment, a black pigment, and a white pigment.

It is preferable that the metal pigment include flat particles having a 50% average particle size R50 of 0.5 to 3 μm, based on a circle-equivalent diameter determined from the area of the flat particles in an X-Y plane, where X is a major axis of the flat particles in a plane and Y is a minor axis of the flat particles in the plane, and that the flat particles satisfy the condition R50/Z>5, where Z is the thickness of the flat particles.

It is preferable that the curable ink composition at least contain a colorant, a photopolymerization initiator, and a polymerizable compound.

It is preferable that the first curable ink composition be nonaqueous and at least contain a photopolymerization initiator and a polymerizable compound.

It is preferable that the second curable ink composition be nonaqueous and at least contain a polymerizable compound but contain no photopolymerization initiator.

It is preferable that the photopolymerization initiator be at least one material selected from the group consisting of a bisacylphosphine oxide, a monoacylphosphine oxide, an α-aminoketone, and an α-hydroxyketone.

It is preferable that the polymerizable compound be at least one material selected from the group consisting of an N-vinyl compound, ethylene glycol monoallyl ether, and a dendritic polymer.

It is preferable that the dendritic polymer be a dendrimer and/or a hyperbranched polymer.

It is preferable that a liquid container include one of the above ink sets.

It is preferable that a liquid-ejecting apparatus include the liquid container.

It is preferable that an ink-jet recording method for recording by ejecting droplets of an ink composition onto a recording medium include forming an image using the ink set according to the first aspect.

It is preferable that the image formation include simultaneously ejecting the metallic ink composition and the curable ink composition selected from the group consisting of the chromatic ink composition, the black ink composition, and the white ink composition to form an image of any color.

It is also preferable that the image formation include ejecting the metallic ink composition to form an image, ejecting the chromatic ink composition to form an image of any color, ejecting the black ink composition and/or the white ink composition, and curing the image during or after the ejection.

It is also preferable that the image formation include ejecting the metallic ink composition to form an image, simultaneously ejecting the chromatic ink composition, the black ink composition, and the white ink composition, and curing the image during or after the ejection.

It is also preferable that the image formation include ejecting the metallic ink composition to form an image, drying the image, ejecting the chromatic ink composition, the black ink composition, and the white ink composition to form an image of any color, and curing the image.

It is preferable that the curing be performed by ultraviolet irradiation.

It is preferable that an ink-jet recording method for recording by ejecting droplets of an ink composition onto a recording medium include forming an image using the ink set according to the second aspect.

It is preferable that the image formation include simultaneously ejecting the metallic ink composition and the first curable ink composition and/or the second curable ink composition and curing the image during or after the ejection, thereby forming an image of any color.

It is also preferable that the image formation include ejecting the metallic ink composition to form an image, ejecting the first curable ink composition and/or the second curable ink composition, and curing the image during or after the ejection, thereby forming an image of any color.

It is also preferable that the image formation include ejecting the first curable ink composition and a second curable ink composition containing the white pigment to form an image, curing the image by light irradiation, and ejecting (i) the metallic ink composition and (ii) the first curable ink composition and/or (iii) a second curable ink composition containing the chromatic pigment or the black pigment to form an image.

It is preferable that a recorded material be obtained by one of the above ink-jet recording methods.

The ink sets according to the aspects of the invention, which include the metallic ink compositions containing the metal pigments, and the ink-jet recording methods using the ink sets allow formation of an image with a highly metallic finish (metallic gloss) on a recording medium. In addition, the chromatic ink composition, the black ink composition, and the white ink composition can be combined to provide an ink set that allows formation of an image that could not be formed using known ink sets, that is, an image of any color with a metallic finish.

DESCRIPTION OF EXEMPLARY EMBODIMENTS

Ink Set According to First Embodiment

An ink set according to this embodiment includes a metallic ink composition containing a metal pigment and at least one curable ink composition selected from the group consisting of a chromatic ink composition, a black ink composition, and a white ink composition. This ink set can be used to form chromatic, black, and white images with metallic finishes.

The metal pigment (also referred to as a metallic pigment) preferably includes flat particles having a 50% average particle size R50 of 0.5 to 3 μm, based on a circle-equivalent diameter determined from the area of the flat particles in an X-Y plane, where X is a major axis of the flat particles in a plane and Y is a minor axis of the flat particles in the plane, and satisfying the condition R50/Z>5, where Z is the thickness of the flat particles.

The term "flat particles" refers to substantially flat particles having a substantially flat surface (X-Y plane) and a substantially uniform thickness (Z). Flat metal particles having a substantially flat surface and a substantially uniform thickness can be formed by pulverizing a deposited metal film. Hence, a major axis of the flat particles in a plane can be defined as X, a minor axis of the flat particles in the plane can be defined as Y, and the thickness of the flat particles can be defined as Z.

The term "circle-equivalent diameter" refers to the diameter of a circle having the same area as the projected area of the substantially flat surface (X-Y plane) of the flat particles of the metallic pigment. For example, if the flat particles of the metallic pigment have a substantially flat polygonal surface (X-Y plane), the circle-equivalent diameter of the flat particles of the metallic pigment is the diameter of a circle to which the projected area of the polygonal surface is converted.

The metallic pigment preferably has a 50% average particle size R50 of 0.5 to 3 μm, more preferably 0.75 to 2 μm, based on the circle-equivalent diameter determined from the area of the flat particles in the X-Y plane, to provide a metallic finish and high print stability.

As for the relationship between the 50% average particle size R50 and the thickness Z, the metallic pigment preferably satisfies the condition R50/Z>5 to provide a highly metallic finish.

The metallic pigment used is preferably aluminum or an aluminum alloy in terms of cost and providing a metallic finish. If an aluminum alloy is used, it can contain any metal or nonmetal element that provides a metallic finish. Preferred examples include silver, gold, platinum, nickel, chromium, tin, zinc, indium, titanium, and copper, which can be added as a simple substance, an alloy, or a mixture.

The metallic pigment is produced from, for example, a composite pigment material composed of a sheet-like substrate on which a delamination resin layer and a metal or metal compound layer are sequentially laminated. The metal or metal compound layer is delaminated from the sheet-like substrate at the interface between the metal or metal compound layer and the delamination resin layer and is pulverized into flat particles. Extracted from the flat particles are those having a 50% average particle size R50 of 0.5 to 3 μm, based on a circle-equivalent diameter determined from the area of the flat particles in an X-Y plane, where X is a major axis of the flat particles in a plane and Y is a minor axis of the flat particles in the plane, and satisfying the condition R50/Z>5, where Z is the thickness of the flat particles.

The major axis X, the minor axis Y, and the circle-equivalent diameter of the metallic pigment (flat particles) in the plane can be measured using a particle image analyzer. Examples of available particle image analyzers include the flow particle image analyzers FPIA-2100, FPIA-3000, and FPIA-3000S, manufactured by Sysmex Corporation.

The metal or metal compound layer is preferably formed by vacuum deposition, ion plating, or sputtering.

The metal or metal compound layer is formed to a thickness of 20 to 100 nm; in this case, a pigment having an average thickness of 20 to 100 nm can be formed. If the metal or metal compound layer has a thickness of 20 nm or more, the metallic pigment delivers high performance as a metallic pigment, including high reflectance and glossiness. If the metal or metal compound layer has a thickness of 100 nm or less, the metallic pigment has low apparent specific gravity and can therefore attain sufficient dispersion stability.

The delamination resin layer of the composite pigment material is used as an undercoat for the metal or metal compound layer and also as a delamination layer for facilitating the delamination from the sheet-like substrate. Preferred examples of the resin used for the delamination resin layer include poly(vinyl alcohol), poly(vinyl butyral), poly (ethylene glycol), poly(acrylic acid), polyacrylamide, cellulose derivatives, acrylic acid polymers, and modified nylon.

A solution of one such resin, or a solution of a mixture of two or more of them, is applied onto a recording medium and is dried, for example, to form a layer. Additives such as a viscosity modifier can be added after the application.

The delamination resin layer is formed by a generally used method such as gravure coating, roll coating, blade coating, extrusion coating, dip coating, or spin coating. After the application and drying, the surface may be planarized by calendering if necessary.

The thickness of the delamination resin layer is preferably, but not limited to, 0.5 to 50 μm, more preferably 1 to 10 μm. A layer with a thickness of less than 0.5 μm is insufficient in terms of the amount of dispersion resin, while a layer with a thickness of more than 50 μm tends to be delaminated from the pigment layer at the interface therebetween when the composite pigment material is rolled.

Examples of the sheet-like substrate used include, but not limited to, releasable films such as polyester films (e.g., polytetrafluoroethylene, polyethylene, polypropylene, and polyethylene terephthalate (PET)), polyamide films (e.g., 6,6-nylon and 6-nylon), polycarbonate films, triacetate films, and polyimide films. Of these, PET or its copolymer is preferred as the sheet-like substrate.

The thickness of the sheet-like substrate is preferably, but not limited to, 10 to 150 μm. If the thickness is 10 μm or more, it causes no problem with, for example, handling during the process. If the thickness is 150 μm or less, it has flexibility and causes no problem with, for example, rolling or delamination.

The metal or metal compound layer may be covered with a protective layer such as a silicon oxide layer or a protective resin layer.

The silicon oxide layer used may be any layer containing silicon oxide and is preferably formed using a silicon alkoxide, such as a tetraalkoxysilane, or its polymer by a sol-gel process.

The silicon oxide layer may be formed by applying an alcohol solution of the silicon alkoxide or its polymer and heating and firing the coating.

The protective resin layer used may be any layer that does not dissolve in a dispersion medium. Examples include poly (vinyl alcohol), poly(ethylene glycol), poly(acrylic acid), polyacrylamide, and cellulose derivatives. Of these, poly(vinyl alcohol) and cellulose derivatives are preferred.

An aqueous solution of one such resin, or an aqueous solution of a mixture of two or more of them, is applied and is dried, for example, to form a layer. The solution may contain additives such as a viscosity modifier.

The silicon oxide layer or the protective resin layer may be formed by the same coating method as used to form the delamination resin layer.

The thickness of the protective layer is preferably, but not limited to, 50 to 150 nm. If the thickness is less than 50 nm, the protective layer lacks mechanical strength. If the thickness is more than 150 nm, the protective layer has excessive strength and is therefore difficult to pulverize or disperse. In addition, such a layer can be delaminated from the metal or metal compound layer at the interface therebetween.

A colorant layer may be disposed between the protective layer and the metal or metal compound layer.

The colorant layer is introduced to impart any color to the composite pigment material. The colorant layer used may be any layer that can contain a colorant capable of imparting any hue or tone in addition to the metallic finish and glossiness of the metallic pigment used in this embodiment. The colorant used for the colorant layer may be either a dye or a pigment, and known dyes and pigments can be used.

The term "pigment" herein used to describe the colorant layer refers to a pigment such as a natural pigment, a synthetic organic pigment, or a synthetic inorganic pigment, as defined in the field of general pigment chemistry; it differs from a layered pigment such as the composite pigment used in this embodiment.

The colorant layer may be formed by any method, preferably, by coating.

If the colorant used for the colorant layer is a pigment, it preferably further contains a colorant dispersion resin. Preferably, the pigment, the colorant dispersion resin, and optionally other additives are dispersed or dissolved in a solvent before the solution is applied to form a uniform liquid film by spin coating and is dried to form a thin resin film.

In the production of the composite pigment material, it is preferable in terms of operating efficiency to form both the colorant layer and the protective layer by coating.

The composite pigment material can be composed of a plurality of layered structures, each having the delamination resin layer and the metal or metal compound layer that are sequentially laminated. In this case, the total thickness of the layered structures of the metal or metal compound layers except the sheet-like substrate and the overlying delamination resin layer, for example, the total thickness of one metal or metal compound layer, one delamination resin layer, and one metal or metal compound layer, or that of one delamination resin layer and one metal or metal compound layer, is preferably 5,000 nm or less. If the thickness is 5,000 nm or less, the composite pigment material is not cracked or delaminated when rolled and therefore has superior storage stability. In addition, a pigment formed of the composite pigment material is preferred in terms of glossiness.

Another example is a structure in which the delamination resin layer and the metal or metal compound layer are sequentially laminated on each surface of the sheet-like substrate, although the invention is not limited to the above examples.

The delamination from the sheet-like substrate may be performed by any method, preferably, by dipping the composite pigment material in a liquid. It is also preferred to perform the delamination simultaneously with pulverization by dipping the composite pigment material in a liquid under ultrasonic treatment.

The pigment thus formed can be used to prepare a stable dispersion only by dispersing it in a solvent because the delamination resin layer functions as a protective colloid. In addition, the resin derived from the delamination resin layer functions to facilitate adhesion of the ink composition containing the pigment to a recording medium such as paper.

The metallic ink composition used for the ink set according to this embodiment contains the metallic pigment, an organic solvent, and a resin.

The concentration of the metallic pigment in the ink composition is preferably 0.1% to 10.0% by weight.

If the concentration of the metallic pigment in the ink composition is equal to or more than 0.1% by weight and less than 1.5% by weight, a half-mirror-like finish with a glossy but see-through appearance can be printed by ejecting an insufficient amount of ink to cover a printing surface, while a metallic finish with high glossiness can be formed by ejecting a sufficient amount of ink to cover the printing surface. For example, such an ink composition is suitable for forming a half-mirror image or a metallic finish with high glossiness on a transparent recording medium. If the concentration of the metallic pigment in the ink composition is 1.5% by weight or more, a matt metallic finish can be formed rather than a highly glossy finish because the pigment particles are randomly arranged on the printing surface. For example, such an ink composition is suitable for forming a shield layer on a transparent recording medium.

The organic solvent used is preferably a polar organic solvent. Examples include alcohols (such as methyl alcohol, ethyl alcohol, propyl alcohol, butyl alcohol, isopropyl alcohol, and fluorinated alcohols), ketones (such as acetone, methyl ethyl ketone, and cyclohexanone), carboxylate esters (such as methyl acetate, ethyl acetate, propyl acetate, butyl acetate, methyl propionate, and ethyl propionate), and ethers (such as diethyl ether, dipropyl ether, tetrahydrofuran, and dioxane).

In particular, the organic solvent preferably contains one or more alkylene glycol ethers that are liquid at normal temperature and pressure.

Examples of alkylene glycol ethers include ethylene glycol ethers and propylene glycol ethers based on alkyl groups (such as methyl, n-propyl, i-propyl, n-butyl, i-butyl, hexyl, and 2-ethylhexyl groups), allyl groups, which have a double bond, and phenyl groups. Such ethers have no color and little smell, behave both as an alcohol and an ether because of the ether and hydroxyl groups in their molecules, and are liquid at room temperature. These ethers can be divided into monoethers, in which one of the hydroxyl groups has been substituted, and diethers, in which the two hydroxyl groups have been substituted. These ethers may be used in combination.

In particular, the organic solvent used is preferably a mixture of an alkylene glycol diether, an alkylene glycol monoether, and a lactone.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of lactones include γ-butyrolactone, δ-valerolactone, and ε-caprolactone.

Examples of the resin used for the metallic ink composition include acrylic resin, styrene-acrylic resin, rosin-modified resin, terpene resin, polyester, polyamide, epoxy resin, poly(vinyl chloride), vinyl chloride-vinyl acetate copolymer, fiber-based resin (e.g., cellulose acetate butyrate and hydroxypropylcellulose), poly(vinyl butyral), polyacrylic polyol, poly(vinyl alcohol), and polyurethane.

The resin used may also be a nonaqueous emulsion of polymer microparticles, which refers to a nonaqueous dispersion (NAD) prepared by stably dispersing microparticles of polyurethane, acrylic resin, or acrylic polyol resin, for example, in an organic solvent. Examples of polyurethane dispersions include Sanprene IB-501 and Sanprene IB-F370, manufactured by Sanyo Chemical Industries, Co., Ltd. Examples of acrylic polyol resin dispersions include N-2043-60MEX and N-2043-AF-1, manufactured by Harima Chemicals, Inc.

The resin is preferably added to the ink composition in an amount of 0.1% to 10% by weight to facilitate adhesion of the pigment to a recording medium.

The ink composition preferably further contains at least one material selected from the group consisting of glycerol, poly(alkylene glycol)s, and saccharides in a total amount of 0.1% to 10% by weight.

Adding such a material can inhibit ink drying and clogging to stabilize ink ejection, thus improving the image quality of a recorded material.

Poly(alkylene glycol)s are linear polymer compounds having ether bonds repeated in their main chains and are produced by, for example, ring-opening polymerization of cyclic ethers.

Examples of poly(alkylene glycol)s include poly(ethylene glycol), poly(propylene glycol), ethylene oxide-propylene oxide copolymer, and derivatives thereof. Any type of copolymer such as a random copolymer, a block copolymer, a graft copolymer, or an alternating copolymer can be used.

A preferred example of a poly(alkylene glycol) is represented by the following formula:

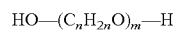

$$HO-(C_nH_{2n}O)_m-H$$

(where n is an integer of 1 to 5 and m is an integer of 1 to 100)

In the above formula, the integer n may be either a single constant or a combination of two or more constants within the above range. For example, if n is 3, the formula gives $(C_3H_6O)_m$, and if n is a combination of 1 and 4, the formula gives $(CH_2O-C_4H_8O)_m$. Also, the integer m may be either a single constant or a combination of two or more constants within the above range. For example, if m is a combination of 20 and 40 in the above example, the formula gives $(CH_2O)_{20}-(C_4H_8O)_{40}$, and if m is a combination of 10 and 30, the formula gives $(CH_2O)_{10}-(C_4H_8O)_{30}$. In addition, any combination of the integers n and m may be selected within the above ranges.

Examples of saccharides include monosaccharides such as pentoses, hexoses, heptoses, and octoses and polysaccharides such as disaccharides, trisaccharides, and tetrasaccharides, and derivatives thereof can also be used, including reduced derivatives such as sugar alcohols and deoxy sugars, oxidized derivatives such as aldonic acids and uronic acids, dehydrated derivatives such as glycoseens, amino sugars, and thio sugars. The term "polysaccharides" refers to sugars in a broad sense, including naturally occurring substances such as alginic acid, dextrin, and cellulose.

The metallic ink composition preferably further contains at least one acetylene glycol surfactant and/or at least one silicone surfactant in an amount of 0.01% to 10% by weight of the content of the pigment in the ink composition.

Adding such a surfactant can improve the wettability of the metallic ink composition on a recording medium, thus providing quick adhesion.

Preferred examples of acetylene glycol surfactants include Surfynol® 465 and Surfynol® 104 (trade names, manufactured by Air Products and Chemicals, Inc.) and Olfine® STG and Olfine® E1010 (trade names, manufactured by Nissin Chemical Industry Co., Ltd.).

The silicone surfactant used is preferably polyester-modified silicone or polyether-modified silicone, as exemplified by BYK-347, BYK-348, BYK-UV3500, BYK-UV3510, BYK-UV3530, and BYK-UV3570 (manufactured by BYK-Chemie Japan K.K.).

The metallic ink composition can be prepared by a commonly used method. For example, the pigment ink composition can be prepared by mixing the metallic pigment, a dispersant, and the solvent, preparing a pigment dispersion with desired ink properties using a ball mill, a bead mill, or a jet mill or with ultrasonic treatment, and adding a binder resin, the solvent, and other additives (such as a dispersion aid and a viscosity modifier) with stirring.

As another example, the composite pigment material may be subjected to a ultrasonic treatment in a solvent to form a composite pigment dispersion before the dispersion is mixed with the necessary ink solvent. Alternatively, the composite pigment material may be subjected to the ultrasonic treatment directly in the ink solvent to form the ink composition.

Although the physical properties of the metallic ink composition are not particularly limited, it preferably has, for example, a surface tension of 20 to 50 mN/m. If the surface tension is less than 20 mN/m, it can be difficult to eject ink droplets because the ink composition widely wets the surface of or exudes from a head of an ink-jet recording printer. If the surface tension is more than 50 mN/m, it can be difficult to perform excellent printing because the ink composition does not wet the surface of a recording medium.

Next, the curable ink composition used for the ink set according to this embodiment will be described. The ink set according to this embodiment includes at least one curable ink composition selected from the group consisting of a chromatic ink composition, a black ink composition, and a white ink composition.

The chromatic ink composition is an ink composition containing a chromatic pigment. The term "chromatic" refers to any color other than colors on a grayscale from black to white (achromatic colors). The chromatic pigment used is preferably an organic pigment in terms of storage stability, for example, light resistance, weather resistance, and gas resistance.

Examples of the chromatic pigment used include azo pigments (e.g., insoluble azo pigments, condensed azo pigments, azo lakes, and chelate azo pigments), polycyclic pigments (e.g., phthalocyanine pigments, perylene and perinone pigments, anthraquinone pigments, quinacridone pigments, dioxane pigments, thioindigo pigments, isoindolinone pigments, and quinophthalone pigments), chelate dyes (e.g., basic chelate dyes and acidic chelate dyes), dye lakes (e.g., basic dye lakes and acidic dye lakes), nitro pigments, nitroso pigments, aniline black, and daylight fluorescent pigments. These pigments can be used alone or in combination of two or more of them.

Specific examples include C.I. Pigment Yellow 1 (Fast Yellow G), 2, 3, 12 (Disazo Yellow AAA), 13, 14, 16, 17, 24, 34, 35, 37, 42 (yellow iron oxide), 53, 55, 73, 74, 75, 81, 83 (Disazo Yellow HR), 93, 94, 95, 97, 98, 100, 101, 104, 108, 109, 110, 117, 120, 128, 129, 138, 139, 150, 153, 154, 155, 180, 185, and 213; C.I. Pigment Red 1, 2, 3, 5, 7, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (red iron oxide), 104, 105, 106, 112, 114, 122 (Quinacridone Magenta), 123, 146, 149, 166, 168, 170, 172, 177, 178, 179, 184, 185, 190, 193, 202, 209, and 219; C.I. Pigment Violet 19; C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 22, 56, 60, and 63; C.I. Pigment Green 1, 4, 7, 8, 10, 17, 18, and 36.

Any other pigment that is not listed in the color index can be used as long as the pigment is insoluble to water.

The black ink composition is an ink composition containing a black pigment. Examples of the black pigment used include carbon black (C.I. Pigment Black 7) such as furnace black, lamp black, acetylene black, and channel black; metal pigments such as copper oxide and iron oxide (C.I. Pigment Black 11); and organic pigments such as aniline black (C.I. Pigment Black 1). Of these, carbon black is preferred for ink-jet use because it has relatively low specific gravity and does not easily sediment in water. These pigments may be used alone or as a mixture of two or more of them.

The white ink composition is an ink composition containing a white pigment. An example of the white pigment is an oxide of a Group IV element, such as titanium dioxide or zirconium dioxide. Other examples include calcium carbonate, calcium sulfate, zinc oxide, barium sulfate, barium carbonate, silica, alumina, kaolin, clay, talc, white clay, aluminum hydroxide, magnesium carbonate, and white hollow resin emulsions. Preferably, these white pigments are used alone or as a mixture of two or more of them.

White hollow resin emulsions are oil-based dispersions containing hollow polymer microparticles.

The white pigment preferably has a primary particle size of 1 μm or less in terms of whiteness.

The term "primary particle size" refers to the size of a particle constituted of single crystals or crystallites equivalent thereto. The primary particle size of the pigment is measured by electron microscopy, where the size of the pigment particles is measured on an electron micrograph. A more reliable measurement can be obtained by dispersing the pigment in an organic solvent, immobilizing the pigment on a support film, and measuring the primary particle size on a transmission electron micrograph after image processing. For example, the primary particle size is determined by measuring the major and minor axes of the primary particles, calculating the diameters of circles having the same areas as the primary particles as the primary particle sizes, and averaging the primary particle sizes of at least 50 particles randomly selected from a predetermined field of view. While any other method with equivalent reliability may be employed, a measurement obtained by the method described above should be used if there is any substantial difference in measurement.

The contents of the pigments in the chromatic ink composition and the black ink composition are each preferably 0.1% to 30% by weight, more preferably 0.5% to 12% by weight, although they may be determined case by case. The content of the pigment in the white ink composition is preferably 1.0% by weight or more, more preferably 5.0% by weight or more, still more preferably 10% to 20% by weight, in terms of whiteness.

In terms of color density, the contents of the pigments in the chromatic ink composition, the black ink composition, and the white ink composition are each preferably 0.1% by weight or more, more preferably 1.0% by weight or more, still more preferably 3.0% to 10.0% by weight.

In addition to the pigment used as a colorant, the curable ink composition used for the ink set according to this embodiment preferably contains a dispersant for dispersing the pigment. The dispersant used may be any dispersant that can be used for this type of pigment ink, for example, a cationic dispersant, an anionic dispersant, a nonionic dispersant, or a surfactant.

Examples of the anionic dispersant include poly(acrylic acid), poly(methacrylic acid), acrylic acid-acrylonitrile copolymer, vinyl acetate-acrylate copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, styrene-α-methylstyrene-acrylic acid-alkyl acrylate copolymer, styrene-maleic acid copolymer, vinylnaphthalene-maleic acid copolymer, vinyl acetate-ethylene copolymer, vinyl acetate-vinylethylene carbonate copolymer, vinyl acetate-maleate copolymer, vinyl acetate-crotonic acid copolymer, and vinyl acetate-acrylic acid copolymer.

Examples of the nonionic dispersant include polyvinylpyrrolidone, poly(propylene glycol), and vinylpyrrolidone-vinyl acetate copolymer.

Examples of the surfactant used as a dispersant include anionic surfactants such as sodium dodecylbenzenesulfonate, sodium laurate, and ammonium salts of polyoxyethylene alkyl ether sulfate; and nonionic surfactants such as polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides. In particular, styrene-(meth) acrylic acid copolymer is preferred to enhance the dispersion stability of the pigment.

Other examples of dispersants include polyoxyalkylene polyalkylene amines and sorbitan esters. Examples of polyoxyalkylene polyalkylene polyamines, as represented by the formula $(C_2H_4N)_n$—(PO)-(EO)$_y$—OH (where n, x, and y are integers of 1 or more; PO is propylene oxide; and EO is ethylene oxide), include Discole N-503, N-506, N-509, N-512, N-515, N-518, and N-520.

In addition to the colorant described above, the photocurable ink composition used for the ink set according to this embodiment preferably contains a photopolymerization initiator and a polymerizable compound.

The photopolymerization initiator used is preferably at least one material selected from the group consisting of a bisacylphosphine oxide, a monoacylphosphine oxide, an α-aminoketone, and an α-hydroxyketone.

The bisacylphosphine oxide, the monoacylphosphine oxide, the α-aminoketone, and the α-hydroxyketone can absorb light with wavelengths of 365 nm or more. Hence, at least one of these compounds can be used as the photopolymerization initiator to provide a more transparent curable ink composition suitable for ultraviolet light with wavelengths of 395 nm or more. In particular, the bisacylphosphine oxide and the monoacylphosphine oxide show absorption at longer wavelengths than the α-aminoketone and the α-hydroxyketone.

An example of the bisacylphosphine oxide is bis(2,4,6-trimethylbenzoyl)phenylphosphine oxide, as is available under the trade name of Irgacure 819 (manufactured by Ciba Specialty Chemicals Inc.).

An example of the monoacylphosphine oxide is 2,4,6-trimethylbenzoyldiphenylphosphine oxide, as is available under the trade name of Darocur TPO (manufactured by Ciba Specialty Chemicals Inc.).

An example of the α-aminoketone is 2-benzyl-2-dimethylamino-1-(4-morpholinophenyl)butanone-1, as is available under the trade name of Irgacure 369 (manufactured by Ciba Specialty Chemicals Inc.).

Examples of the α-hydroxyketone include 2-hydroxy-2-methyl-1-phenylpropan-1-one and 1-hydroxycyclohexyl phenyl ketone, as are available under the trade names of Darocur 1173 and Irgacure 184 and 127 (manufactured by Ciba Specialty Chemicals Inc.).

The photocurable ink composition used for the ink set according to this embodiment may contain two or more such photopolymerization initiators as described above, which may be used in combination with other photopolymerization initiators.

Typical examples of photopolymerization initiators that can be used in combination include benzoin methyl ether, benzoin ethyl ether, isopropyl benzoin ether, isobutyl benzoin ether, 1-phenyl-1,2-propandione 2-(o-ethoxycarbonyl) oxime, benzil, diethoxyacetophenone, benzophenone, chlorothioxanthone, 2-chlorothioxanthone, isopropylthioxanthone, diethylthioxanthone, 2-methylthioxanthone, polychlorinated polyphenyl, and hexachlorobenzene. Of these, isobutyl benzoin ether and 1-phenyl-1,2-propandione 2-(o-ethoxycarbonyl)oxime are preferred.

Other examples include photopolymerization initiators available under the trade names of Vicure 10 and 30 (manufactured by Stauffer Chemical Company); Irgacure 127, 184, 500, 651, 2959, 907, 369, 379, 754, 1700, 1800, 1850, 819, 4265, and OXE01 and Darocur 1173, ITX, and TPO (manufactured by Ciba Specialty Chemicals Inc.); Quantacure CTX and ITX (manufactured by Aceto Corporation); Kayacure DETX-S (manufactured by Nippon Kayaku Co., Ltd.); ESACURE KIP150 (manufactured by Lamberti Spa); and Lucirin TPO (manufactured by BASF SE).

The polymerizable compound used is preferably at least one material selected from the group consisting of an N-vinyl compound, ethylene glycol monoallyl ether, and a dendritic polymer in terms of storage stability.

Examples of the polymerizable compound include allylic compounds, preferably, allyl ether compounds such as ethylene glycol monoallyl ether, trimethylolpropane diallyl ether, trimethylolpropane monoallyl ether, glycerol monoallyl ether, allyl glycidyl ether, and pentaerythritol triallyl ether. In particular, ethylene glycol monoallyl ether, trimethylolpropane diallyl ether, and N-vinyl compounds are preferred.

Ethylene glycol monoallyl ether and N-vinyl compounds, which are monofunctional radical polymerizable monomers, are preferred because they have a low tendency to undergo undesirable polymerization due to dark reaction during storage. In particular, allylic compounds such as ethylene glycol monoallyl ether and trimethylolpropane diallyl ether do not polymerize alone even in the presence of carbon radicals produced by decomposition of the radical photopolymerization initiator.

The N-vinyl compound used is preferably N-vinylformamide in terms of curability.

The amount of ethylene glycol monoallyl ether or N-vinyl compound added is preferably 50% to 95% by weight.

The dendritic polymer used is preferably a hyperbranched polymer and/or a dendrimer in terms of reducing ink viscosity.

The term "hyperbranched polymer" refers to a dendritic polybranched polymer that includes many branches but does not necessarily have a regular molecular structure. The hyperbranched polymer used is preferably one having a dipentaerythritol core with branches of functional groups, as is available under the trade names of STAR-501 and STAR-502 (manufactured by Osaka Organic Chemical Industry Ltd.).

In this embodiment, Viscoat #1000 (manufactured by Osaka Organic Chemical Industry Ltd.) and STAR-501 are used as hyperbranched polymers. Viscoat #1000 and STAR- 501 are hyperbranched polymers having a dipentaerythritol core with branches of functional groups. Viscoat #1000 contains ethylene glycol diacrylate as a diluent monomer and has a viscosity of 273 Pa·s and 14 functional groups (acrylic groups). STAR-501 contains dipentaerythritol hexaacrylate as a diluent monomer and has a viscosity of 210 Pa·s and 20 to 99 functional groups (acrylic groups). Both are preferred because they have acryloyl groups on their outermost sides.

While dendrimers are costly to produce because they have high stereoregularity and therefore require numerous production steps, hyperbranched polymers are advantageous in terms of cost because they have lower stereoregularity and can therefore be relatively easily synthesized.

The term "dendrimer" refers to a dendritic polybranched polymer that includes many branches and has a regular, flawless molecular structure. This type of polymer allows reactive functional groups to be arranged on the outermost side of a molecule at a higher density in a more concentrated manner than commonly used linear polymers.

The amount of dendritic polymer added is preferably 1.0% to 30.0% by weight.

The curable ink composition may contain any other polymerizable compounds that can be polymerized with radicals or ions produced from the photopolymerization initiator. Such polymerizable compounds are those whose molecules can serve as structural units of a basic polymer structure. These polymerizable compounds are also referred to as photopolymerizable monomers, including monofunctional monomers, bifunctional monomers, and polyfunctional monomers.

Typical examples of the monofunctional monomers include (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, methoxydiethylene glycol monoacrylate, acryloylmorpholine, lauryl methacrylate, allyl glycol, 2-hydroxyethyl methacrylate, cyclohexyl methacrylate, and oxetane methacrylate.

Typical examples of the bifunctional monomers include ethylene glycol dimethacrylate, diethylene glycol diacrylate, diethylene glycol dimethacrylate, tripropylene glycol diacrylate, 1,9-nonandiol diacrylate, polyethylene glycol diacrylate, tetraethylene glycol dimethacrylate, 1,6-hexandiol diacrylate, 1,6-hexandiol dimethacrylate, neopentyl glycol diacrylate, neopentyl glycol dimethacrylate, 2-hydroxy-1,3-dimethacryloxypropane, and neopentyl glycol hydroxypivalate diacrylate.

Typical examples of the polyfunctional monomers include trimethylolpropane triacrylate, trimethylolpropane trimethacrylate, an ethylene oxide adduct of trimethylolpropane triacrylate, a propylene oxide adduct of trimethylolpropane triacrylate, an ethylene oxide adduct of glycerol triacrylate, ethylene oxide-modified glycerol triacrylate, a propylene oxide adduct of glycerol triacrylate, pentaerythritol triacrylate, dipentaerythritol hexaacrylate, (2,2,2-triacryloyloxymethyl)ethyl hydrogen phthalate, dipentaerythritol polyacrylate, trimethylolpropane diallyl ether, pentaerythritol triallyl ether, and glycerol monoallyl ether.

The photocurable ink composition may contain a polymerization accelerator, for example, microparticles having polymerizable functional groups.

The polymerization accelerator used is preferably, but not limited to, at least one of an amine compound, a thioxanthone, or polymerizable microparticles. Examples include aminobenzoates such as Darocur EHA and EDB (manufactured by Ciba Specialty Chemicals Inc.), thioxanthone, isopropylthioxanthone, dimethylthioxanthone, diethylthioxanthone, and polymerizable microparticles having polymerizable functional groups on their surfaces.

The polymerization acceleration mechanism of the microparticles having polymerizable functional groups has not been clearly understood. It is assumed that radicals produced by decomposition of the photopolymerization initiator after ultraviolet absorption are trapped and stabilized on the surfaces of the microparticles to trigger polymerization reaction of the polymerizable functional groups introduced on the surfaces of the microparticles and the polymerizable compound adsorbed thereon, thus accelerating the polymerization reaction.

The microparticles having the polymerizable functional groups may be, but not limited to, an extender pigment, for example, an inorganic compound such as silica, alumina, titania, or calcium oxide. Of these, transparent compounds such as silica and alumina are preferable, and silica is particularly preferable.

Examples of the polymerizable functional groups of the microparticles include, but not limited to, acryloyl groups and methacryloyl groups. Polymerizable functional groups having one or more double bonds are also permitted.

The size of the microparticles is preferably, but not limited to, 10 to 200 nm.

Although the method used to prepare the microparticles having the polymerizable functional groups is not particularly limited, they can be prepared by, for example, forming silica microparticles having many hydroxyl groups by a sol-gel process using a silane compound such as tetraethoxysilane and allowing the microparticles to react with a compound (silane coupling agent) capable of adding polymerizable functional groups to the hydroxyl groups.

The content of the microparticles having the polymerizable functional groups is not particularly limited and may be determined according to, for example, the usage form and conditions and the relationship between the viscosity and polymerizability of the ink composition. The content is preferably 10% or less of the total weight of the ink composition.

The amount of polymerization accelerator added is preferably 0.01% to 5.0% by weight.

The curable ink composition may contain at least one thermal radical polymerization inhibitor to achieve higher storage stability.

The thermal radical polymerization inhibitor used is preferably a hindered phenolic compound or a hindered amine light stabilizer (HALS). An example of the hindered phenolic compound is Irgastab UV-22 (manufactured by Ciba Specialty Chemicals Inc.). An example of the HALS is Irgastab UV-10 (manufactured by Ciba Specialty Chemicals Inc.).

The curable ink composition may contain a sensitizer.

The sensitizer used may be a coumarin compound or a thioxanthone compound.

The sensitizer is a compound that allows radicals to be produced by hydrogen extraction, energy transfer, or electron transfer when the compound is excited by absorption of light with which the ink composition is irradiated for photocuring.

Coumarin compounds not only provide a sensitization effect by transferring energy to other molecules when they are excited by ultraviolet absorption, but also emit fluorescence when they fall to their ground states. It is assumed that the photopolymerization initiator absorbs the fluorescence resulting from the light irradiation to attain increased sensitivity. The ink set according to this embodiment is particularly effective for a printed material with a thick film. While less irradiation light reaches deep inside the thick film on the printed material, a coumarin compound, having the above effect, emits fluorescence inside the ink to improve sensitivity, thus successfully curing the inside of the film on the printed material.

Preferred examples of coumarin compounds include coumarin, 4-methylcoumarin, 7-hydroxycoumarin, 7-amino-4-methylcoumarin, 7-hydroxy-4-trifluoromethylcoumarin, 3-(2-benzothiazoyl)-7-(diethylamino)coumarin, 7-acetoxy-3-(2-benzoxazoyl)coumarin, 6,7-diethoxy-4-(trifluoromethyl)coumarin, and 2,3,6,7-tetrahydro-9-methyl-1H,5H-quinolizino(9,1-gh)coumarin.

Preferred examples of thioxanthone compounds include thioxanthone, isopropylthioxanthone, 2,4-diethylthioxanthone, and chlorothioxanthone.

The concentration of the sensitizer in the curable ink composition is preferably 0.01% to 1.0% by weight.

The curable ink composition can be prepared by a commonly used method. For example, a desired curable ink composition can be prepared by mixing a pigment dispersion and an ink solvent and filtering the mixture.

Liquid Container and Liquid-Ejecting Apparatus

According to this embodiment, a liquid container including the ink set described above can be provided. According to this embodiment, additionally, a liquid-ejecting apparatus including the liquid container can be provided.

Ink-Jet Recording Method

An ink-jet recording method according to this embodiment for recording by driving an ink-jet head to eject droplets of an ink composition onto a recording medium includes forming an image using the ink set described above.

The metallic ink composition containing the metal pigment can be used alone to form an image with a metallic finish whose relative specular glossinesses at incident angles of 20°, 60°, and 85°, as specified in Japanese Industrial Standards (JIS) Z8741, are measured to be 200 or more, 200 or more, and 100 or more, respectively, at the same time. The use of this metallic ink composition allows formation of images with desired metallic finishes, ranging from matt images to glossy images.

Specifically, an image with a matt metallic finish can be formed if the relative specular glossinesses at incident angles of 20°, 60°, and 85°, as specified in JIS Z8741, are measured to be equal to or more than 200 and less than 400, equal to or more than 200 and less than 400, and 100 or more, respectively, at the same time.

In addition, a glossy metallic image on which a reflection of an object can be slightly seen can be formed if the relative specular glossinesses at incident angles of 20°, 60°, and 85°, as specified in JIS Z8741, are measured to be equal to or more than 400 and less than 600, equal to or more than 400 and less than 600, and 100 or more, respectively, at the same time.

Furthermore, a sharp, glossy metallic image on which a reflection of an object can be clearly seen, namely, a mirror-finished image, can be formed if the relative specular glossinesses at incident angles of 20°, 60°, and 85°, as specified in JIS Z8741, are measured to be 600 or more, 600 or more, and 100 or more, respectively, at the same time.

An image can be formed by simultaneously ejecting the metallic ink composition containing the metal pigment and at least one curable ink composition selected from the group consisting of the chromatic ink composition, the black ink composition, and the white ink composition. This allows a metallic appearance to be added to the colors of the chromatic pigment, the black pigment, and the white pigment.

If the metallic ink composition containing the metal pigment and the curable ink compositions such as the chromatic ink composition, the black ink composition, and the white ink composition are separately ejected, for example, it is preferable to form an image with a metallic finish using the metallic ink composition containing the metal pigment before the image formation using the chromatic ink composition.

The metallic pigment does not easily permeate an ink-accepting layer on a recording medium and therefore remains deposited on the recording medium whether it has the ink-accepting layer or not. In contrast, when the chromatic ink composition is ejected onto the ink-accepting layer on the recording medium, the pigment contained therein easily permeates the ink-accepting layer. Hence, the color of the pigment of the chromatic ink composition can be made more distinct if the metallic ink composition containing the metal pigment is ejected onto the recording medium to form a deposited layer of the metallic pigment before the pigment of the chromatic ink composition is deposited thereon.

It is also possible to form an image by ejecting the metallic ink composition to form an image with a metallic finish, ejecting the chromatic ink composition to form an image of any color with a metallic finish, and ejecting the black ink composition and/or the white ink composition.

Examples of the method for ejecting the ink compositions will be described below.

A first method is electrostatic attraction. For example, ink droplets are continuously ejected from a nozzle by applying a strong electric field across acceleration electrodes disposed on and in front of the nozzle. The ink droplets then travel between deflection electrodes to which print information signals are supplied, thereby performing recording. Alternatively, the ink droplets are ejected based on the print information signals without being deflected.

A second method is to forcedly eject ink droplets by mechanically oscillating a nozzle with a quartz oscillator, for example, while applying pressure to the ink with a small pump. The ejected ink droplets, electrically charged at the same time as the ejection, travel between deflection electrodes to which print information signals are supplied, thereby performing recording.

A third method is the use of a piezoelectric element. Ink droplets are ejected by simultaneously supplying pressure and print information signals to the ink through the piezoelectric element, thereby performing recording.

A fourth method is the use of thermal energy to suddenly expand the ink. Ink droplets are ejected by heating the ink with minute electrodes based on print information signals to cause the ink to form bubbles, thereby performing recording.

Any of the methods described above can be used for the ink-jet recording method according to this embodiment, and the ink set according to this embodiment can be used with an ink-jet cartridge based on any of the above methods.

After the ejection of the curable ink compositions, droplets deposited on the recording medium are cured and/or dried by a common method.

An example of the method for curing includes ejecting the metallic ink composition to form an image, ejecting the chromatic ink composition, and curing the image during or after the ejection. Another example includes ejecting the metallic ink composition to form an image, simultaneously ejecting the chromatic ink composition, the black ink composition, and the white ink composition, and curing the image during or after the ejection. A further example includes ejecting the metallic ink composition to form an image, ejecting the chromatic ink composition to form an image of any color, ejecting the black ink composition and/or the white ink composition, and curing the image during or after the ejection.

These methods allow formation of a full-color image with a metallic finish.

The drying and the curing can also be combined by, for example, ejecting the metallic ink composition to form an image, drying the image, ejecting the chromatic ink composition, the black ink composition, and the white ink composition to form an image of any color, and curing the image.

This method allows formation of a full-color image with a metallic finish.

The curing is preferably performed by ultraviolet irradiation. It is preferable to select appropriate conditions for ultraviolet irradiation based on the amount and thickness of the ink compositions deposited on, for example, a substrate or a recording medium. Although it may be difficult to exactly specify such conditions, the wavelength of light emitted from a light irradiation apparatus, for example, is preferably 350 to 450 nm.

The dosage of ultraviolet radiation is preferably 10 to 10,000 mJ/cm$^2$, more preferably 50 to 6,000 mJ/cm$^2$. Within such ranges of ultraviolet dosage, the curable ink compositions can be sufficiently cured.

The ultraviolet irradiation may be performed using, for example, a lamp such as a metal halide lamp, a xenon lamp, a carbon arc lamp, a chemical lamp, a low-pressure mercury lamp, or a high-pressure mercury lamp. For example, commercially available lamps such as H-lamps, D-lamps, and V-lamps manufactured by Fusion UV Systems, Inc. can be used.

To reduce energy consumption, particularly, the ultraviolet irradiation is preferably performed using an ultraviolet light-emitting semiconductor device such as an ultraviolet light-emitting diode (ultraviolet LED) or an ultraviolet light-emitting semiconductor laser.

The recording medium used is not particularly limited, and various recording media can be used, including plain paper, ink-jet paper (matt paper and glossy paper), glass, plastic, film, metal, and printed circuit boards.

If the recording medium has an ink-accepting layer, non-heating printing is preferred to avoid heat damage.

If the recording medium has no ink-accepting layer, heating printing is preferred to increase drying speed and to attain high glossiness.

Examples of the method for heating include heating the recording medium by bringing it into contact with a heat source and noncontact heating using infrared light, microwaves (electromagnetic waves with peak wavelengths around 2,450 MHz), or hot air.

The heating is preferably performed before, during, and/or after the printing; in other words, the recording medium may be heated at any time before, during, or after the printing, or throughout the printing. The heating temperature is preferably 30° C. to 80° C., more preferably 40° C. to 60° C., depending on the type of recording medium used.

Recorded Material

A recorded material according to this embodiment is obtained by recording using the ink set and the ink-jet recording method described above. Accordingly, the recorded material can have a metallic image of any color.

Ink Set According to Second Embodiment

An ink set according to this embodiment includes a metallic ink composition containing a metal pigment, a first curable ink composition containing no colorant, and at least one second curable ink composition containing a colorant selected from the group consisting of a chromatic pigment, a black pigment, and a white pigment. This ink set can be used to form chromatic, black, and white images with metallic finishes.

The second embodiment is similar to the first embodiment except that the ink set includes the first curable ink composition containing no colorant and at least one second curable ink composition containing a colorant selected from the group consisting of a chromatic pigment, a black pigment, and a white pigment, instead of at least one curable ink composition selected from the group consisting of a chromatic ink composition, a black ink composition, and a white ink composition, as used in the first embodiment. Hence, the description of the metallic ink composition containing the metal pigment in the first embodiment holds true for the second embodiment.

Next, the curable ink compositions used for the ink set according to this embodiment will be described. The first and second curable ink compositions used for the ink set according to this embodiment are provided as a binary curable ink composition; the first curable ink composition contains no colorant, while the second photocurable ink composition contains a colorant selected from the group consisting of a chromatic pigment, a black pigment, and a white pigment.

Preferably, the first curable ink composition is nonaqueous and at least contains a photopolymerization initiator and a polymerizable compound.

Examples of the photopolymerization initiator used for the first curable ink composition are similar to those shown in the first embodiment, and the description thereof holds true for the second embodiment.

The first curable ink composition may contain two or more such photopolymerization initiators as described above, which may be used in combination with other photopolymerization initiators.

Examples of photopolymerization initiators that can be used in combination are similar to those shown in the first embodiment, and the description thereof holds true for the second embodiment.

The amount of photopolymerization initiator added is preferably 0.1% to 15% by weight.

Preferably, the second curable ink composition is nonaqueous and at least contains a polymerizable compound but contains no photopolymerization initiator.

The polymerizable compound used for the first and second ink compositions is preferably at least one material selected from the group consisting of an N-vinyl compound, ethylene glycol monoallyl ether, and a dendritic polymer in terms of storage stability.

N-vinylformamide and ethylene glycol monoallyl ether, which are monofunctional radical polymerizable monomers, are preferred because they have a low tendency to undergo undesirable polymerization due to dark reaction during storage.

If the amount of N-vinylformamide and/or ethylene glycol monoallyl ether added is less than 20% by weight, the ink compositions can be unsatisfactory in terms of, for example, viscosity, dispersion stability, or storage stability. If the amount of N-vinylformamide and/or ethylene glycol monoallyl ether added is more than 80% by weight, the ink compositions can be unsatisfactory in terms of curing properties or coating strength as a binary curable ink composition. More preferably, the amount of N-vinylformamide and/or ethylene glycol monoallyl ether added is about 20% to 70% by weight.

Examples of the dendritic polymer used in this embodiment are similar to those shown in the first embodiment, and the description thereof holds true for the second embodiment.

Preferably, the dendritic polymer used in this embodiment is solid at room temperature and has a number average molecular weight of 1,000 to 100,000, particularly preferably 2,000 to 50,000. If the molecular weight falls below the above range, a printed image becomes fragile. If the molecular weight exceeds the above range, the ink compositions become impractical in terms of ejection properties because the ink viscosity is not sufficiently decreased by reducing the amount of dendritic polymer added.

Other polymerizable compounds may also be contained. Examples of such polymerizable compounds are similar to those shown in the first embodiment, and the description thereof holds true for the second embodiment.

The first and second curable ink compositions may contain a surfactant such as a silicone surfactant. The silicone surfactant, for example, is preferably polyester-modified silicone or polyether-modified silicone, particularly preferably polyether-modified polydimethylsiloxane or polyester-modified polydimethylsiloxane. Examples include BYK-347, BYK-348, BYK-UV3500, BYK-UV3510, BYK-UV3530, and BYK-UV3570 (manufactured by BYK-Chemie Japan K.K.).

The first and second curable ink compositions may contain a polymerization accelerator. The type and amount of polymerization accelerator added are as described in the first embodiment.

The first and second curable ink compositions may contain at least one thermal radical polymerization inhibitor to achieve higher storage stability. The thermal radical polymerization inhibitor used may be one contained in a typical polymerizable composition, for example, a phenolic antioxidant, an HALS, a phosphorus antioxidant, hydroquinone monomethyl ether, as widely used for (meth)acrylic monomers, hydroquinone, t-butylcatechol, or pyrogallol. Of these, an HALS is preferred, as exemplified by Irgastab UV-10 (manufactured by Ciba Specialty Chemicals Inc.).

For the ink set according to this embodiment, only the second curable ink composition contains a colorant. The colorant used is preferably a pigment in terms of print durability. The pigment contained in the second curable ink composition may be at least one material selected from the group consisting of a chromatic pigment, a black pigment, and a white pigment.

An organic or inorganic pigment may be used as the pigment used for the second curable ink composition without any particular limitations.

Examples of the chromatic pigment, the black pigment, and the white pigment are similar to those for the chromatic ink composition, the black ink composition, and the white ink composition, respectively, used in the first embodiment, and the description thereof holds true for the second embodiment.

The contents of the chromatic and black pigments are each preferably 0.1% by weight or more, more preferably 1.0% by weight or more, still more preferably 3.0% to 10.0% by weight, in terms of print glossiness and a bronzing-inhibiting effect. The content of the white pigment is preferably 1.0% by weight or more, more preferably 5.0% by weight or more, still more preferably 10% to 20% by weight, in terms of whiteness.

In addition to the pigment used as a colorant, the second curable ink composition preferably contains a dispersant for dispersing the pigment. The dispersant used may be any dispersant that can be used for this type of pigment ink, for example, a cationic dispersant, an anionic dispersant, a nonionic dispersant, or a surfactant.

Examples of the cationic dispersant, the anionic dispersant, the nonionic dispersant, and the surfactant are similar to those for the pcurable ink composition used in the first embodiment.

According to the preferred embodiment of the invention, the above pigments can be dispersed in an aqueous medium with a dispersant or a surfactant to prepare a pigment dispersion used as the second curable ink composition. The dispersant used is preferably one commonly used to prepare a pigment dispersion, for example, a polymer dispersant.

In addition to four basic colors, namely, yellow, magenta, cyan, and black, tints and shades of the respective hues may be used as the color of the colorant contained in the second curable ink composition used for the ink set according to this embodiment. For example, light magenta (tint of magenta), red (shade of magenta), light cyan (tint of cyan), blue (shade of cyan), and violet can be used. In addition, neutral colors such as green and orange can be used. As for the two achromatic colors, namely, black and white, gray (tint of black), light black (tint of black), matt black (shade of black), cream, and ivory, for example, can be used. Furthermore, metallic colors such as silver, gold, copper, and chrome silver can be used.

Other additives may optionally be used, including a leveling agent, a matting agent, and additives for modifying the physical properties of film, such as polyester, polyurethane, polyvinyl, acrylic resin, rubber, polyacrylic polyol, polyoxyalkylene polyalkylene amine, and wax. In addition, the first and second curable ink composition may contain other known ingredients that are commonly used for binary curable inks, including a wetting agent, a penetrant, a pH adjuster, a preservative, and a fungicide.

The ink set according to this embodiment is used by mixing the first and second curable ink compositions before curing them by light irradiation. The mixing, followed by the curing, may be performed before or after printing. That is, the mixing and the printing may be performed by depositing the first and second curable ink compositions at the same position on a recording medium or by mixing the first and second curable ink compositions before depositing the mixture on the recording medium.

Liquid Container and Liquid-Ejecting Apparatus

According to this embodiment, a liquid container including the ink set described above can be provided. According to this embodiment, additionally, a liquid-ejecting apparatus including the liquid container can be provided.

Ink-Jet Recording Method

An ink-jet recording method according to this embodiment for recording by driving an ink-jet head to eject droplets of an ink composition onto a recording medium includes forming an image using the ink set described above.

As in the first embodiment, the metallic ink composition containing the metal pigment can be used alone to form an image with a metallic finish whose relative specular glossinesses at incident angles of 20°, 60°, and 85°, as specified in JIS Z8741, are measured to be 200 or more, 200 or more, and 100 or more, respectively, at the same time. The use of this metallic ink composition allows formation of images with desired metallic finishes, ranging from matt images to glossy images. Examples of images with metallic finishes that can be formed are similar to those of the first embodiment.

An image can be formed by simultaneously ejecting the metallic ink composition containing the metal pigment and the first curable ink composition and/or the second curable ink composition. This allows a metallic appearance to be added to the colors of the chromatic pigment, the black pigment, and the white pigment.

If the metallic ink composition containing the metal pigment and the first curable ink composition and/or the second curable ink composition are separately ejected, for example, it is preferable to form an image with a metallic finish using the metallic ink composition containing the metal pigment before forming an image of any color by ejecting the first curable ink composition and/or the second curable ink composition.

The metallic pigment does not easily permeate an ink-accepting layer on a recording medium and therefore remains deposited on the recording medium whether it has the ink-accepting layer or not. In contrast, when the second curable ink composition is ejected onto the ink-accepting layer on the recording medium, the pigment contained therein easily permeates the ink-accepting layer. Hence, the color of the pigment of the second curable ink composition can be made more distinct if the metallic ink composition containing the metal pigment is ejected onto the recording medium to form a deposited layer of the metallic pigment before the pigment contained in the second curable ink composition is deposited thereon.

Examples of the method for ejecting the ink compositions include the first to fourth methods described in the first embodiment.

Any of the methods described above can be used for the ink-jet recording method according to this embodiment, and the ink set according to this embodiment can be used with an ink-jet cartridge based on any of the above methods. To avoid heat damage to the ink compositions, the first to third methods are preferably selected because the ink-jet head is not heated.

After the ejection of the curable ink compositions, droplets deposited on the recording medium are cured and/or dried by a common method.

An example of the method for curing includes ejecting the first curable ink composition and a second curable ink composition containing the white pigment to form an image, curing the image by light irradiation, and ejecting (i) the metallic ink composition and (ii) the first curable ink composition and/or (iii) an second photocurable ink composition containing the chromatic pigment or the black pigment to form an image.

This method allows formation of a full-color image with a metallic finish.

Another example includes ejecting the metallic ink composition to form an image, simultaneously ejecting the first curable ink composition and/or the second curable ink composition to form an image, and curing the image during or after the ejection.

This method allows formation of a full-color image with a metallic finish.

The drying and the curing can also be combined by, for example, ejecting the metallic ink composition to form an image, drying the image, simultaneously ejecting the first curable ink composition and/or the second curable ink composition to form an image, and curing the image during or after the ejection.

This method allows formation of a full-color image with a metallic finish.

The curing is preferably performed by ultraviolet irradiation, as in the first embodiment, and the description thereof holds true for the second embodiment.

Recorded Material

A recorded material according to this embodiment is obtained by recording using the ink set and the ink-jet recording method described above. Accordingly, the recorded material can have a metallic image of any color.

Example 1

1. Metallic Ink Composition (1) Preparation of Metallic Pigment Dispersion

A resin-layer coating liquid containing 3.0% by weight of cellulose acetate butyrate (butylation rate: 35% to 39%; manufactured by Kanto Chemical Co., Inc.) and 97% by weight of diethylene glycol diethyl ether (manufactured by Nippon Nyukazai Co., Ltd.) was uniformly applied onto a PET film with a thickness of 100 μm by bar coating and was dried at 60° C. for ten minutes to form a thin resin layer on the PET film.

An aluminum layer was then deposited on the resin layer to an average thickness of 20 nm using a vacuum deposition apparatus (VE-1010, manufactured by Vacuum Device Inc.).

The laminate thus formed was simultaneously subjected to delamination, pulverization, and dispersion in diethylene glycol diethyl ether using a ultrasonic dispersion apparatus (VS-150, manufactured by AS ONE Corporation) for a total ultrasonic dispersion time of 12 hours to prepare a metallic pigment dispersion.

The metallic pigment dispersion thus prepared was filtered through a 5 μm mesh stainless filter to remove coarse particles. The filtrate was poured into a round-bottom flask and was distilled using a rotary evaporator to remove diethylene glycol diethyl ether, thus condensing the metallic pigment dispersion. The concentration of the pigment in the condensed metallic pigment dispersion was adjusted afterwards, so that a metallic pigment dispersion 1 having a pigment concentration of 5% by weight was obtained.

In addition, a metallic pigment dispersion 2 containing a metallic pigment was prepared under different deposition conditions and/or with a different ultrasonic dispersion time.

The 50% average particle sizes R50, based on a circle-equivalent diameter in a plane including a major axis (X direction) and a minor axis (Y direction), and the average thicknesses Z of the metallic pigments were measured using a particle size/particle distribution measurement apparatus (FPIA-3000S, manufactured by Sysmex Corporation), and the measurements of R50 and Z were used to calculate R50/Z. The results are shown in Table 1.

TABLE 1

| Metallic pigment dispersion | 50% average particle size R50 (μm) | Average thickness Z (μm) | R50/Z |
|---|---|---|---|
| 1 | 1.03 | 0.02 | 51.5 |
| 2 | 1.13 | 0.02 | 56.5 |

(2) Preparation of Metallic Ink Composition

Metallic pigment ink compositions were prepared using the metallic pigment dispersions prepared by the method described above according to the compositions shown in Table 2. The metallic pigment dispersions were added to ink solvents prepared by mixing and dissolving solvents and additives and were mixed and stirred with a magnetic stirrer at normal temperature and pressure for 30 minutes to prepare metallic pigment ink compositions (S1 to S3).

In Table 2, the diethylene glycol diethyl ether (DEGdEE), dipropylene glycol monobutyl ether (DPGmBE), and tetraethylene glycol dimethyl ether (TEGdME) used were manufactured by Nippon Nyukazai Co., Ltd. The γ-butyrolactone used was manufactured by Kanto Chemical Co., Inc. The polyacrylic polyol resin emulsions (N-2043-AF-1 and N-2043-60MEX) used were manufactured by Harima Chemicals, Inc. The surfactant (BYK-UV3500) used was manufactured by BYK-Chemie Japan K.K. The values are expressed in percent by weight.

TABLE 2

Unit: percent by weight

| Ingredients | Metallic ink composition | | |
|---|---|---|---|
| | S1 | S2 | S3 |
| DEGdEE | 47.8 | 61.8 | 61.3 |
| DPGmBE | 45.0 | | |
| γ-Butyrolactone | | 15.0 | 15.0 |
| TEGdME | | 18.0 | 18.0 |
| N-2043-AF-1 | 6.0 | 4.0 | |
| N-2043-60MEX | | | 4.0 |
| BYK-UV3500 | 0.2 | 0.2 | 0.2 |
| Pigment solid content | 1.0 | 1.0 | 1.5 |
| Metallic pigment dispersion | (1) | (2) | (2) |

2. Color Ink Composition

(1) Preparation of Polymerizable Microparticles and Dispersion Thereof

First, 88.1 parts by weight of a silica sol (IPA-ST, an isopropyl alcohol (hereinafter referred to as "IPA") dispersion containing 30% by weight of silica, manufactured by Nippon Chemical Industrial Co., Ltd.) was poured into a 200 ml Erlenmeyer flask, to which 7.9 parts by weight of 3-methacryloxypropyltrimethoxysilane (silane coupling agent SILA-ACE S710, manufactured by Chisso Corporation) was added. Then, 4 parts by weight of 0.05 mol/L hydrochloric acid was added to the dispersion with stirring using a magnetic stirrer. The dispersion was stirred at room temperature for 24 hours to facilitate its reaction, thus preparing an IPA dispersion A containing polymerizable microparticles (MPS) having methacryloyl groups.

In addition, a dispersion B containing 30% by weight of the polymerizable microparticles was prepared by pouring 70 parts by weight of N-vinylformamide (hereinafter referred to as "NVF") (Beamset 770, manufactured by Arakawa Chemical Industries, Ltd.) and 100 parts by weight of the above dispersion A into a 300 ml round-bottom flask and removing IPA using a rotary evaporator.

(2) Preparation of Pigment Dispersion (2-1) Yellow Pigment Dispersion (C)

As a pigment used as a colorant, C.I. Pigment Yellow (P.Y.) 74, polyurethane (average molecular weight: about 20,000; hereinafter referred to as a "dispersant"), and NVF were mixed in a ratio of 15:5:80 and were subjected to dispersion in a sand mill (manufactured by Yasukawa Seisakusho) with glass beads (diameter: 1.7 mm) weighing 1.5 times the weight of the mixture for two hours. The glass beads were removed afterwards, thus obtaining a pigment dispersion C (pigment concentration: 15% by weight).

(2-2) Magenta Pigment Dispersion (D)

A pigment dispersion D (pigment concentration: 15% by weight) was prepared in the same manner as the pigment dispersion C except that the pigment used was C.I. Pigment Red (P.R.) 122.

(2-3) Cyan Pigment Dispersion (E)

A pigment dispersion E (pigment concentration: 15% by weight) was prepared in the same manner as the pigment dispersion C except that the pigment used was C.I. Pigment Blue (P.B.) 15:3.

(2-4) Black Pigment Dispersion (F)

A pigment dispersion F (pigment concentration: 15% by weight) was prepared in the same manner as the pigment dispersion C except that the pigment used was C.I. Pigment Black (P.Bk.) 7.

(2-5) White Pigment Dispersion (G)

A titanium-bearing ore was dissolved in sulfuric acid to prepare a titanium sulfate solution. The titanium sulfate solution was subjected to hydrolysis to obtain hydrous titanium oxide. Added to 100 parts by weight of the hydrous titanium oxide in terms of titanium dioxide content were 0.50 parts by weight of ammonium phosphate, 0.30 parts by weight of potassium sulfate, and 0.30 parts by weight of aluminum sulfate. The hydrous titanium oxide was heated in a rotary muffle furnace for laboratory use until the product temperature reached 1,020° C., thus obtaining titanium dioxide microparticles. The microparticles were cooled to room temperature and were examined by transmission electron microscopy, revealing that the microparticles were anatase microparticles with an average primary particle size of 0.13 μm.

Then, 15 parts by weight of the titanium dioxide microparticles, serving as a surface-finished white pigment, 5 parts by weight of a polyoxyalkylene-added polyalkylene amine (Discole N-518, manufactured by Dai-ich Kogyo Seiyaku Co., Ltd.), serving as a dispersant, and 80 parts by weight of ethylene glycol monoallyl ether (hereinafter referred to as "AG") were mixed and were subjected to dispersion in a sand mill (manufactured by Yasukawa Seisakusho) with zirconia beads (diameter: 1.0 mm) weighing 1.5 times the weight of the slurry for two hours. The beads were removed afterwards, thus obtaining a pigment dispersion G containing 60% by weight of the titanium dioxide microparticles.

(3) Preparation of Ink Composition (3-1) Yellow Pigment Ink Composition (Y1)

First, 20 parts by weight of the dispersion B and 10 parts by weight of the pigment dispersion C were poured into a light-tight container. Added to the dispersion were 29 parts by weight of NVF, 25 parts by weight of tripropylene glycol diacrylate (hereinafter referred to as "TPGDA"; Aronix M-220, manufactured by Toagosei Co., Ltd.), 10 parts by weight of ethylene oxide-modified glycerol triacrylate (hereinafter referred to as "AGE3", HK Ester A-Gly-3E, manufactured by Shin-Nakamura Chemical Co., Ltd.), 4.0 parts by weight of bis(2,4,6-trimethylbenzoyl)phenylphosphine oxide (Irgacure 819, manufactured by Ciba Specialty Chemicals Inc.), 1.0 part by weight of 2-benzyl-2-dimethylamino-1-(4-morpholinophenyl)butanone-1 (Irgacure 369, manufactured by Ciba Specialty Chemicals Inc.), and 1 part by weight of 2-ethylhexyl 4-dimethylaminobenzoate (Darocur EHA, manufactured by Ciba Specialty Chemicals Inc.). The dispersion was mixed and stirred with a magnetic stirrer for one hour and was filtered through a 5 μm mesh membrane filter in an ultraviolet-shielded environment to prepare a yellow ink composition Y1 having the composition shown in Table 3.

(3-2) Magenta, Cyan, and Black Pigment Ink Compositions (M1, C1, and Bk1)

Similarly, a magenta ink composition M1, a cyan ink composition C1, and a black ink composition Bk1 having the compositions shown in Table 3 were prepared using the pigment dispersions D, E, and F, respectively, instead of the pigment dispersion C.

TABLE 3

Unit: percent by weight

| Ingredients | Y1 | M1 | C1 | Bk1 |
|---|---|---|---|---|
| NVF | 51.0 | 51.0 | 51.0 | 51.0 |
| TPGDA | 25.0 | 25.0 | 25.0 | 25.0 |
| AGE3 | 10.0 | 10.0 | 10.0 | 10.0 |
| Dispersant | 0.5 | 0.5 | 0.5 | 0.5 |
| Irgacure 819 | 4.0 | 4.0 | 4.0 | 4.0 |
| Irgacure 369 | 1.0 | 1.0 | 1.0 | 1.0 |
| Darocur EHA | 1.0 | 1.0 | 1.0 | 1.0 |
| Polymerizable microparticles | 6.0 | 6.0 | 6.0 | 6.0 |
| Colorant | PY 74 1.5 | PR 122 1.5 | PB 15:3 1.5 | PBk 7 1.5 |

(3-3) White Ink Composition (W1)

Of the ingredients shown in Table 4, the solvents and additives other than AG, the pigment, and the dispersant were mixed and completely dissolved to prepare an ink solvent. The pigment dispersion G was gradually dripped into the ink solvent with stirring. After the dripping was completed, the mixture was stirred at room temperature for 30 minutes and was filtered through a 5 μm membrane filter to prepare a white ink composition W1 shown in Table 4. In the composition shown in Table 4, "AG" refers to ethylene glycol monoallyl ether manufactured by Nippon Nyukazai Co., Ltd., "Irgacure 127" refers to a polymerization initiator manufactured by Ciba Specialty Chemicals Inc., "Darocur EDB" refers to a polymerization accelerator manufactured by Ciba Specialty Chemicals Inc., "BYK-UV3570" refers to a silicone surfactant manufactured by BYK-Chemie Japan K.K., and "Irgastab UV-10" refers to a polymerization inhibitor manufactured by Ciba Specialty Chemicals Inc.

TABLE 4

Unit: percent by weight

| Ingredients | W1 |
|---|---|
| NVF | 25.0 |
| AG | 47.6 |
| Hyperbranched polymer | 10.0 |
| Polyoxyalkylene-added polyalkylene amine | 2.0 |
| Irgacure 819 | 6.4 |
| Irgacure 127 | 1.6 |
| Darocur EDB | 1.0 |
| BYK-UV3570 | 0.2 |
| Irgastab UV10 | 0.2 |
| Titanium dioxide microparticles | 6.0 |

(3-4) Yellow, Magenta, Cyan, Black, and White Pigment Ink Compositions (Y2, M2, C2, Bk2, and W2)

Similarly, a yellow ink composition Y2, a magenta ink composition M2, a cyan ink composition C2, a black ink composition Bk2, and a white ink composition W2 having the compositions shown in Table 5 were prepared.

TABLE 5

Unit: percent by weight

| Ingredients | Y2 | M2 | C2 | Bk2 | W2 |
|---|---|---|---|---|---|
| NVF | 25.0 | 25.0 | 25.0 | 25.0 | — |
| AG | 41.6 | 41.6 | 41.6 | 41.6 | 57.6 |
| Viscoat #1000 | 20.0 | 20.0 | 22.5 | 22.5 | 25.0 |
| Irgacure 819 | 4.0 | 4.0 | 4.0 | 4.0 | 4.0 |
| Irgacure 127 | 1.0 | 1.0 | 1.0 | 1.0 | 1.0 |
| BYK-UV3500 | 0.2 | 0.2 | 0.2 | 0.2 | 0.2 |
| Irgastab UV10 | 0.2 | 0.2 | 0.2 | 0.2 | 0.2 |
| Dispersant | 2.0 | 2.0 | 1.5 | 1.5 | 4.0 |
| Colorant | PY 213 6.0 | PV 19 6.0 | PB 15:3 4.0 | PBk 7 4.0 | Titanium dioxide microparticles 8.0 |

3. Ink Set

The ink compositions prepared in Items 1 and 2 above were used to form ink sets having the combinations shown in Table 6.

TABLE 6

| | Metallic ink | Chromatic ink | Black ink | White ink |
|---|---|---|---|---|
| Ink set A | S1 | C1, M1, Y1 | Bk1 | W1 |
| Ink set B | S2 | C1, M1, Y1 | Bk1 | W1 |
| Ink set C | S3 | C1, M1, Y1 | Bk1 | W1 |
| Ink set D | S1 | C2, M2, Y2 | Bk2 | W2 |
| Ink set E | S2 | C2, M2, Y2 | Bk2 | W2 |
| Ink set F | S3 | C2, M2, Y2 | Bk2 | W2 |

4. Print Evaluation Test

The ink sets of Item 3 above were used with an ink-jet printer (SJ-540, manufactured by Roland DG Corporation). The ink compositions were charged into the corresponding color lines. That is, the black, yellow, magenta, and cyan ink compositions were charged into black, yellow, magenta, and cyan lines, respectively. The metallic and white ink compositions were charged into light cyan and light magenta lines, respectively. Printing was performed according to the print patterns described below. The recording media used were A4-size poly(vinyl chloride) sheets (Viewcal 2000 (white), manufactured by Sakurai Co., Ltd.), A4-size PET films (PG-50L, manufactured by Rami Corporation Inc.), and A4-size polycarbonate films (Iupilon FE-2000, manufactured by Mitsubishi Engineering-Plastics Corporation). Printouts were evaluated according to the following evaluation criteria. The results are shown in Table 7.

AA: A metallic finish on which a reflection of an object could be clearly seen was formed.

A: A metallic finish on which a reflection of an object could be slightly seen was formed.

B: A matt metallic finish was formed.

C: No metallic finish was formed.

The print patterns using the above ink sets were as follows.

a. Print Pattern 1

A metallic image was formed using the metallic ink composition at a heating temperature of 50° C., and an image was further formed on the metallic image using the chromatic ink compositions. The image was then irradiated with ultraviolet light using an ultraviolet irradiation apparatus including an ultraviolet light-emitting diode having a peak wavelength of 365 nm (NICHIA i-LED NCCU033, manufactured by Nichia Corporation), an ultraviolet light-emitting diode having a peak wavelength of 380 nm (NICHIA NCCU001, manufactured by Nichia Corporation), and a light-emitting diode having a peak wavelength of 395 nm (E1S40-0P0C6-01, manufactured by Toyoda Gosei Co., Ltd.). The intensity of ultraviolet irradiation on a surface under irradiation was 20 mW/cm² for each of the diodes having peak wavelengths of 365, 380, and 395 nm, that is, a total of 60 mW/cm². The ultraviolet irradiation was performed for five seconds under such conditions that the total quantity of light per ultraviolet irradiation was 300 mJ/cm², thus curing the image.

b. Print Pattern 2

An image was formed by ejecting the metallic ink composition at a heating temperature of 50° C., and an image was further formed using the chromatic ink compositions. The image was then irradiated with ultraviolet light using an ultraviolet irradiation apparatus including an ultraviolet light-emitting diode having a peak wavelength of 365 nm (NICHIA i-LED NCCU033, manufactured by Nichia Corporation), an ultraviolet light-emitting diode having a peak wavelength of 380 nm (NICHIA NCCU001, manufactured by Nichia Corporation), and a light-emitting diode having a peak wavelength of 395 nm (E1S40-0P0C6-01, manufactured by Toyoda Gosei Co., Ltd.). The intensity of ultraviolet irradiation on a surface under irradiation was 20 mW/cm² for each of the diodes having peak wavelengths of 365, 380, and 395 nm, that is, a total of 60 mW/cm². The ultraviolet irradiation was performed for five seconds under such conditions that the total quantity of light per ultraviolet irradiation was 300 mJ/cm², thus curing the image. An image was further formed by simultaneously ejecting the black ink composition and the white ink composition and was cured during or after the ejection by ultraviolet irradiation under the same conditions as above.

c. Print Pattern 3

An image was formed using the metallic ink composition at a heating temperature of 50° C., and an image was further formed by ejecting the chromatic ink compositions, the black ink composition, and the white ink composition. The image was then irradiated with ultraviolet light using an ultraviolet irradiation apparatus including an ultraviolet light-emitting diode having a peak wavelength of 365 nm (NICHIA i-LED NCCU033, manufactured by Nichia Corporation), an ultraviolet light-emitting diode having a peak wavelength of 380 nm (NICHIA NCCU001, manufactured by Nichia Corporation), and a light-emitting diode having a peak wavelength of 395 nm (E1S40-0P0C6-01, manufactured by Toyoda Gosei Co., Ltd.). The intensity of ultraviolet irradiation on a surface under irradiation was 20 mW/cm² for each of the diodes having peak wavelengths of 365, 380, and 395 nm, that is, a total of 60 mW/cm². The ultraviolet irradiation was performed for five seconds under such conditions that the total quantity of light per ultraviolet irradiation was 300 mJ/cm², thus curing the image.

d. Print Pattern 4

An image was formed using the metallic ink composition at a heating temperature of 50° C. and was dried at 60° C. for 15 minutes, and an image was further formed by ejecting the chromatic ink compositions, the black ink composition, and the white ink composition. The image was then irradiated with ultraviolet light using an ultraviolet irradiation apparatus including an ultraviolet light-emitting diode having a peak wavelength of 365 nm (NICHIA i-LED NCCU033, manufactured by Nichia Corporation), an ultraviolet light-emitting diode having a peak wavelength of 380 nm (NICHIA NCCU001, manufactured by Nichia Corporation), and a light-emitting diode having a peak wavelength of 395 nm (E1S40-0P0C6-01, manufactured by Toyoda Gosei Co., Ltd.). The intensity of ultraviolet irradiation on a surface under irradiation was 20 mW/cm² for each of the diodes having peak wavelengths of 365, 380, and 395 nm, that is, a total of 60 mW/cm². The ultraviolet irradiation was performed for five seconds under such conditions that the total quantity of light per ultraviolet irradiation was 300 mJ/cm², thus curing the image.

TABLE 7

| | Print pattern | | | |
|---|---|---|---|---|
| | 1 | 2 | 3 | 4 |
| Ink set A | B | B | B | A |
| Ink set B | A | A | A | AA |
| Ink set C | AA | AA | AA | AA |
| Ink set D | B | B | B | A |
| Ink set E | A | A | A | AA |
| Ink set F | AA | AA | AA | AA |

As shown in Table 7, recorded materials with metallic images of any colors could be obtained using the ink sets and the ink-jet recording methods described above.

Example 2

1. Metallic Ink Composition

The metallic ink compositions S1 to S3 prepared in the same manner as in Example 1 were used.

2. Color Ink Composition (1) Preparation of Dendritic Polymer

A hyperbranched polymer and dendrimers were used as dendritic polymers in this example.

The hyperbranched polymer used was "STAR-501", manufactured by Osaka Organic Chemical Industry Ltd. "STAR-501", a hyperbranched polymer having a dipentaerythritol core with branches of functional groups, contained dipentaerythritol hexaacrylate as a diluent monomer and had a viscosity of 210 mPa·s and 20 to 99 functional groups (acrylic groups).

Dendrimers 7 and 9 were synthesized as follows.

First, 31 g of ethylenediamine, 256 g of dimethyl acrylate, and 300 g of methanol were poured into a 1 L reaction container and were allowed to react with stirring at 40° C. in a nitrogen gas flow for six hours. After the reaction was completed, the mixture was distilled using a rotary evaporator to remove methanol and was purified by reprecipitation in an excess of diethyl ether. A resultant reaction product 1 was dissolved in 500 g of methanol before the subsequent reaction.

The methanol solution containing the reaction product 1 was poured into a 2 L reaction container, was mixed with 240 g of ethylenediamine, and was allowed to react with stirring at 27° C. in a nitrogen gas flow for six hours. After the reaction, the methanol removal and the purification by reprecipitation were similarly performed. A resultant reaction product 2 was dissolved in 1,000 g of methanol before the subsequent reaction.

The methanol solution containing the reaction product 2 was poured into a 5 L reaction container, was mixed with 667 g of dimethyl acrylate, and was allowed to react with stirring at 40° C. in a nitrogen gas flow for six hours. After the reaction, the methanol removal and the purification by reprecipitation were similarly performed. A resultant reaction product 3 was dissolved in 2,000 g of methanol before the subsequent reaction.

The methanol solution containing the reaction product 3 was poured into a reaction container, was mixed with 361 g of ethylenediamine, and was allowed to react with stirring at 27° C. in a nitrogen gas flow for six hours. After the reaction, the methanol removal and the purification by reprecipitation were similarly performed. A resultant reaction product 4 was dissolved in 2,000 g of acetone dehydrated through a molecular sieve before the subsequent reaction.

Poured into a reaction container were 1,000 g of the acetone solution containing the reaction product 4 and 2,153 g of 1,1-bis(acryloyloxymethyl)ethyl isocyanate (Karenz BEI, manufactured by Showa Denko K.K.), which were mixed and stirred in a nitrogen gas flow, were mixed and stirred with 1 g of 1,4-diazabicyclo[2.2.2]octane (DABCO, manufactured by Tokyo Chemical Industry Co., Ltd.), and were allowed to react for six hours after the reaction temperature was raised to 50° C.

After the reaction was completed, the mixture was distilled using a rotary evaporator to remove acetone and was mixed with 6,838 g of ethylene glycol monoallyl ether to prepare an ethylene glycol monoallyl ether solution 8 containing 30% by weight of the dendrimer 7. Each molecule of the dendrimer 7 had 72 acryloyl groups attached to the outermost side thereof.

Also, the acetone solution containing the reaction product 4 was distilled using a rotary evaporator to remove acetone and was mixed with 6,838 g of ethylene glycol monoallyl ether to prepare an ethylene glycol monoallyl ether solution 10 containing 30% by weight of the dendrimer 9. Each molecule of the dendrimer 9 molecules had no radical polymerizable groups attached to the outermost side thereof.

(2) Preparation of Pigment Dispersion

Pigment dispersions were prepared by the following method. First, 15 parts by weight of C.I. Pigment Black 7 (carbon black), serving as a colorant, and 3.5 parts by weight of Discole N-509 (manufactured by Dainichiseika Color & Chemicals Mfg. Co., Ltd.), serving as a dispersant, were mixed and stirred with ethylene glycol monoallyl ether (hereinafter referred to as "AG"; manufactured by Nippon Nyukazai Co., Ltd.), serving as a monomer, so that the total amount of the mixture was 100 parts by weight. The mixture was subjected to dispersion in a sand mill (manufactured by Yasukawa Seisakusho) with zirconia beads (diameter: 1.5 mm) for six hours. The zirconia beads were removed using a separator afterwards, thus obtaining a black pigment dispersion.

Similarly, pigment dispersions corresponding to the respective colors, that is, a cyan pigment dispersion (C.I. Pigment Blue 15:3), a magenta pigment dispersion (C.I. Pigment Violet 19), a yellow pigment dispersion (C.I. Pigment Yellow 155), and a white pigment dispersion (titanium dioxide microparticles) were prepared.

(3) Preparation of Ink Compositions A1 and B1 to B5

Ink compositions A1 and B1 to B5 were prepared according to the compositions shown in Table 8. Specifically, the monomer, radical photopolymerization initiator, polymerization accelerator, surfactant, and thermal radical polymerization inhibitor shown in Table 8 were mixed and completely dissolved. In preparation of the ink compositions containing the pigment dispersions, the pigment dispersions were gradually dripped into the solvent with stirring. After the dripping was completed, the mixtures were stirred at room temperature for one hour and were filtered through a 5 μm membrane filter, thus obtaining a transparent ink composition (ink composition A1), a black ink composition (ink composition B1), a yellow ink composition (ink composition B2), a magenta ink composition (ink composition B3), a cyan ink composition (ink composition B4), and a white ink composition (ink composition B5). The values in Table 8 are expressed in percent by weight.

In Table 8, "NVF" refers to N-vinylformamide manufactured by Arakawa Chemical Industries, Ltd., "AG" refers to ethylene glycol monoallyl ether manufactured by Nippon Nyukazai Co., Ltd., "STAR-501" refers to a hyperbranched polymer manufactured by Osaka Organic Chemical Industry Ltd., "Irgacure 819" and "Irgacure 127" refer to radical photopolymerization initiators manufactured by Ciba Specialty Chemicals Inc., "Darocur EHA" refers to a polymerization accelerator manufactured by Ciba Specialty Chemicals Inc., "BYK-UV3570" refers to a silicone surfactant manufactured by BYK-Chemie Japan K.K., and "Irgastab UV-10" refers to a thermal radical polymerization inhibitor manufactured by Ciba Specialty Chemicals Inc.

TABLE 8

| | Unit: percent by weight Ink Composition | | | | | |
|---|---|---|---|---|---|---|
| Ingredients | A1 | B1 | B2 | B3 | B4 | B5 |
| NVF | 25.0 | 25.0 | 25.0 | 25.0 | 25.0 | 25.0 |
| AG | 59.3 | 57.7 | 57.7 | 57.7 | 57.7 | 57.7 |
| STAR-501 | 6.6 | 13.2 | 13.2 | 13.2 | 13.2 | 13.2 |
| Irgacure 819 | 6.4 | — | — | — | — | — |
| Irgacure 127 | 1.6 | — | — | — | — | — |
| Darocur EHA | 1.0 | 1.0 | 1.0 | 1.0 | 1.0 | 1.0 |
| BYK-UV3570 | 0.1 | 0.1 | 0.1 | 0.1 | 0.1 | 0.1 |
| Irgastab UV10 | 0.05 | 0.05 | 0.05 | 0.05 | 0.05 | 0.05 |
| Pigment | — | PBk 7 | PY 151 | PV 19 | PB 15:3 | PW 6 |
| Pigment solid content | — | 3.0 | 3.0 | 3.0 | 3.0 | 3.0 |

(4) Preparation of Ink Compositions A2 and B6 to B10

Similarly, a transparent ink composition (ink composition A2), a black ink composition (ink composition B6), a yellow ink composition (ink composition B7), a magenta ink composition (ink composition B8), a cyan ink composition (ink composition B9), and a white ink composition (ink composition B10) were prepared according to the compositions shown in Table 9. The values in Table 9 are expressed in percent by weight.

In Table 9, "Viscoat #1000" refers to a hyperbranched polymer manufactured by Osaka Organic Chemical Industry Ltd.

TABLE 9

| | Unit: percent by weight Ink Composition | | | | | |
|---|---|---|---|---|---|---|
| Ingredients | A2 | B6 | B7 | B8 | B9 | B10 |
| NVF | 25.0 | 25.0 | 25.0 | 25.0 | 25.0 | 25.0 |
| AG | 54.6 | 51.6 | 51.6 | 51.6 | 51.6 | 48.6 |
| Viscoat #1000 | 15.0 | 20.0 | 20.0 | 20.0 | 20.0 | 20.0 |
| Irgacure 819 | 4.0 | — | — | — | — | — |
| Irgacure 127 | 1.0 | — | — | — | — | — |
| BYK-UV3500 | 0.2 | 0.2 | 0.2 | 0.2 | 0.2 | 0.2 |
| Irgastab UV10 | 0.2 | 0.2 | 0.2 | 0.2 | 0.2 | 0.2 |
| Pigment | — | PBk 7 | PY 213 | PV 19 | PB 15:3 | PW 6 |
| Pigment solid content | — | 3.0 | 3.0 | 3.0 | 3.0 | 6.0 |

3. Ink Set

The ink compositions prepared in Items 1 and 2 above were used to form ink sets having the combinations shown in Table 10.

TABLE 10

|  | Metallic ink | Transparent ink | Color ink |
|---|---|---|---|
| Ink set G | S1 | A1 | B1-B5 |
| Ink set H | S2 | A1 | B1-B5 |
| Ink set I | S3 | A1 | B1-B5 |
| Ink set J | S1 | A2 | B6-B10 |
| Ink set K | S2 | A2 | B6-B10 |
| Ink set L | S3 | A2 | B6-B10 |

4. Print Evaluation Test

The ink sets of Item 3 above were used with two ink-jet printers (SJ-540, manufactured by Roland DG Corporation). For one of the two ink-jet printers (IJP-1), the ink compositions S1 to S3 (metallic ink compositions), the ink compositions A1 and A2 (transparent ink compositions), and the ink compositions B5 and B10 (white ink compositions) were charged into a black line, a light cyan line, and a light magenta line, respectively.

For the other ink-jet printer (IJP-2), the ink compositions B1 and B6 (black ink compositions), the ink compositions B2 and B7 (yellow ink compositions), the ink compositions B3 and B8 (magenta ink compositions), and the ink compositions B4 and B9 (cyan ink compositions) were charged into a black line, a yellow line, a magenta line, and a cyan line, respectively, and the ink compositions A1 and A2 (transparent ink compositions) and the ink compositions B5 and B10 (white ink compositions) were charged into a light cyan line and a light magenta line, respectively. Printing was performed according to the print patterns described below.

The recording media used were A4-size poly(vinyl chloride) sheets (Viewcal 2000 (white), manufactured by Sakurai Co., Ltd.), A4-size PET films (PG-50L, manufactured by Rami Corporation Inc.), and A4-size polycarbonate films (Iupilon FE-2000, manufactured by Mitsubishi Engineering-Plastics Corporation). Printouts were evaluated according to the following evaluation criteria. The results are shown in Table 11.

AA: A metallic finish on which a reflection of an object could be clearly seen was formed.

A: A metallic finish on which a reflection of an object could be slightly seen was formed.

B: A matt metallic finish was formed.

C: No metallic finish was formed.

The print patterns using the above ink sets were as follows.

a. Print Pattern 1

Using the IJP-1, an image was formed by simultaneously ejecting the metallic ink composition S1, the ink composition A1 or A2 (transparent ink composition), and the ink composition B5 or B10 (white ink composition) under such heating conditions that the surface temperature of a recording medium reached 50° C. The image was then cured by ultraviolet irradiation using an ultraviolet irradiation apparatus.

The ultraviolet irradiation apparatus included an ultraviolet light-emitting diode having a peak wavelength of 365 nm (NICHIA i-LED NCCU033, manufactured by Nichia Corporation), an ultraviolet light-emitting diode having a peak wavelength of 380 nm (NICHIA NCCU001, manufactured by Nichia Corporation), and a light-emitting diode having a peak wavelength of 395 nm (E1S40-0P0C6-01, manufactured by Toyoda Gosei Co., Ltd.).

The intensity of ultraviolet irradiation on a surface under irradiation was 20 mW/cm$^2$ for each of the diodes having peak wavelengths of 365, 380, and 395 nm, that is, a total of 60 mW/cm$^2$. The ultraviolet irradiation was performed for five seconds under such conditions that the total quantity of light per ultraviolet irradiation was 300 mJ/cm$^2$.

b. Print Pattern 2

Using the IJP-1, an image was formed using the metallic ink composition S1 under such heating conditions that the surface temperature of a recording medium reached 50° C. Using the IJP-2, subsequently, an image was further formed on the image by simultaneously ejecting the ink composition A1 or A2 (transparent ink composition) and the ink compositions B1 to B5 or B6 to B10 (black, yellow, magenta, cyan, and white ink compositions). The image was then cured by ultraviolet irradiation under the same conditions as the print pattern 1.

c. Print Pattern 3

Using the IJP-1, a white image was formed on a recording medium by simultaneously ejecting the ink composition A1 or A2 (transparent ink composition) and the ink composition B5 or B10 (white ink composition). The image was then cured by ultraviolet irradiation under the same conditions as the print pattern 1.

Using the IJP-1, subsequently, a metallic image was formed using the metallic ink composition S1 under such heating conditions that the surface temperature of the recording medium reached 50° C. Using the IJP-2, an image was further formed on the metallic image by simultaneously ejecting the ink composition A1 or A2 (transparent ink composition) and the ink compositions B1 to B5 or B6 to B10 (black, yellow, magenta, cyan, and white ink compositions). The image was then cured by ultraviolet irradiation under the same irradiation conditions as above.

The print evaluation was also performed using the same print patterns 1 to 3 by replacing the metallic ink composition S1 with the metallic ink compositions S2 and S3.

TABLE 11

|  | Print pattern | | |
|---|---|---|---|
|  | 1 | 2 | 3 |
| Ink set G | A | A | B |
| Ink set H | AA | AA | B |
| Ink set I | AA | AA | B |
| Ink set J | A | A | B |
| Ink set K | AA | AA | B |
| Ink set L | AA | AA | B |

As shown in Table 11, recorded materials with metallic images of any colors could be obtained using the ink sets and the ink-jet recording methods described above.

What is claimed is:

1. An ink-jet recording method for forming an image onto a recording medium comprising:
ejecting a metallic nonaqueous ink composition containing a metal pigment and an organic solvent being a mixture of an alkylene glycol diether, alkylene glycol monoether, and a lactone, the lactone comprising at least one of γ-butyrolactone, σ-valerolactone, and ε-caprolactone, wherein the metal pigment includes flat particles having the 50% average particle size R50 of 0.5 to 3 μm, based on the circle-equivalent diameter determined from the area of the flat particles in the X-Y plane, wherein X is the major axis of the flat particles in the plane and Y is the minor axis of the flat particles in the plane, the flat particles satisfying the condition R50/Z>5, wherein Z is the thickness of the flat particles onto the recording medium to form an image with a metallic finish on a recording medium and ejecting at least one curable ink composition selected from the group consisting of a chromatic ink composition, a black ink composition and a white ink composition onto the image with a metallic finish to form an image of any color with a metallic finish, wherein the recording medium is selected from at least one of a poly(vinyl chloride) sheet, polyethylene terephthAlAte (PET) film; and polycarbonate film.

2. The ink-jet recording method according to claim 1, wherein the image formation includes simultaneously ejecting the metallic ink composition and the curable ink composition selected from the group consisting of the chromatic ink composition, the black ink composition, and the white ink composition to form an image of any color.

3. The ink-jet recording method according to claim 1, wherein the image formation includes ejecting the metallic ink composition to form an image, ejecting the chromatic ink composition to form an image of any color, ejecting the black ink composition and/or the white ink composition, and curing the image during or after the ejection.

4. The ink-jet recording method according to claim 1, wherein the image formation includes ejecting the metallic ink composition to form an image, simultaneously ejecting the chromatic ink composition, the black ink composition, and the white ink composition, and curing the image during or after the ejection.

5. The inkjet recording method according to claim 1, wherein the image formation includes ejecting the metallic ink composition to form an image, drying the image, ejecting the chromatic ink composition, the black ink composition, and the white ink composition to form an image of any color, and curing the image.

6. The ink-jet recording method according to claim 4, wherein the curing is performed by ultraviolet irradiation.

7. The method of claim 1, wherein the organic solvent comprises an alkylene glycol diether and an alkylene glycol monoether.

8. The method of claim 1, wherein the alkylene glycol monoethers comprises one or more of ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene, glycol monomethyl ether, propylene glycol monoethyl ether, dipropylene glycol monomethyl ether, and dipropylene glycol monoethyl ether, and the alkylene glycol diethers comprises one or more of ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

9. The method of claim 1, wherein the image with a metallic finish exhibits a relative specular glossinesses at incident angles of 20°, 60°, and 85°, as specified in Japanese Industrial Standards (JIS) Z8741, that are measured to be 200 or more and less than 400, 200 or more and less than 400, and 100 or more, respectively.

10. The method of claim 1, wherein the image with a metallic finish exhibits a relative specular glossinesses at incident angles of 20°, 60°, and 85°, as specified in Japanese Industrial Standards (JIS) Z8741, that are measured to be 400 or more and less than 600, 400 or more and less than 600, and 100 or more, respectively.

* * * * *